United States Patent
Zhao et al.

(10) Patent No.: US 8,571,358 B2
(45) Date of Patent: Oct. 29, 2013

(54) METHODS AND APPARATUSES FOR FACILITATING CONTENT-BASED IMAGE RETRIEVAL

(75) Inventors: Feng Zhao, Beijing (CN); Hao Wang, Beijing (CN)

(73) Assignee: Nokia Corporation, Espoo (FI)

( * ) Notice: Subject to any disclaimer, the term of this patent is extended or adjusted under 35 U.S.C. 154(b) by 352 days.

(21) Appl. No.: 12/982,698

(22) Filed: Dec. 30, 2010

(65) Prior Publication Data
US 2011/0158558 A1    Jun. 30, 2011

(30) Foreign Application Priority Data

Dec. 30, 2009   (WO) ................. PCT/CN2009/076240

(51) Int. Cl.
*G06K 9/54* (2006.01)
*G06F 7/00* (2006.01)

(52) U.S. Cl.
USPC .......................................... 382/305; 707/721

(58) Field of Classification Search
USPC ......... 382/165, 181, 282, 305, 306, 312, 173; 707/707, 713, 705, 721, 728
See application file for complete search history.

(56) References Cited

U.S. PATENT DOCUMENTS

| | | | |
|---|---|---|---|
| 6,584,221 B1 * | 6/2003 | Moghaddam et al. ........ | 382/165 |
| 6,721,733 B2 * | 4/2004 | Lipson et al. ................ | 1/1 |
| 6,744,935 B2 | 6/2004 | Choi et al. | |
| 6,748,398 B2 | 6/2004 | Zhang et al. | |
| 6,760,714 B1 * | 7/2004 | Caid et al. .................. | 706/14 |
| 6,792,164 B2 * | 9/2004 | Syeda-Mahmood ......... | 382/305 |
| 7,099,860 B1 | 8/2006 | Liu et al. | |
| 7,111,002 B2 | 9/2006 | Zhang et al. | |
| 7,113,944 B2 | 9/2006 | Zhang et al. | |
| 7,117,226 B2 | 10/2006 | Labelle | |
| 7,421,125 B1 | 9/2008 | Rees | |
| 7,630,560 B2 * | 12/2009 | Wenzel ........................ | 382/209 |

(Continued)

FOREIGN PATENT DOCUMENTS

| | | |
|---|---|---|
| CN | 1508754 A | 6/2004 |
| CN | 1945580 A | 4/2007 |
| CN | 101093491 A | 12/2007 |
| WO | 2008073505 A1 | 6/2008 |

OTHER PUBLICATIONS

International Search Report and Written Opinion from corresponding PCT Application No. PCT/CN2009/076240, dated Oct. 21, 2010, 11 pages.

(Continued)

*Primary Examiner* — Kanjibhai Patel
(74) *Attorney, Agent, or Firm* — Nokia Corporation

(57) ABSTRACT

Methods and apparatuses are provided for facilitating content-based image retrieval. A method may include determining a selected target image. The method may further include generating a candidate region of interest set including one or more regions of interest within the target image. The method may additionally include determining a recommended region of interest set including one or more recommended regions of interest selected from the candidate region of interest set based at least in part upon evaluation criteria. The evaluation criteria may be determined based at least in part upon analysis of maintained region of interest-based searching history. The method may also include providing the recommended region of interest set for user selection of one or more target regions of interest from the recommended region of interest set as query criteria for searching an image library for one or more result images. Corresponding apparatuses are also provided.

20 Claims, 15 Drawing Sheets

(56) References Cited

U.S. PATENT DOCUMENTS

| | | | |
|---|---|---|---|
| 7,860,854 B2 * | 12/2010 | Lipson et al. | 707/707 |
| 8,009,921 B2 * | 8/2011 | Csurka | 382/228 |
| 8,229,931 B2 * | 7/2012 | Rothmuller et al. | 707/738 |
| 8,254,684 B2 * | 8/2012 | Raju | 382/181 |
| 2003/0053686 A1 | 3/2003 | Luo et al. | |
| 2003/0179213 A1 | 9/2003 | Liu | |

OTHER PUBLICATIONS

Moghaddam et al., "Regions-of-Interest and Spatial Layout for Content-Based Image Retrieval", Mitsubishi Electric Information Technology Center of America, Nov. 2000, 9 pages.

* cited by examiner

METHODS AND APPARATUSES FOR FACILITATING CONTENT-BASED IMAGE RETRIEVAL

RELATED APPLICATION

The subject application claims priority benefit to Patent Cooperation Treaty Application No. PCT/CN2009/076240, filed Dec. 30, 2009 and is hereby incorporated by reference.

TECHNOLOGICAL FIELD

Embodiments of the present invention relate generally to image management technology and, more particularly, relate to methods, and apparatuses for facilitating content-based image retrieval.

BACKGROUND

The modern computing era has brought about a tremendous expansion in the power and storage capacity of computing devices. Many computing devices now include sufficient power and storage capacity to store, view, and manipulate large numbers of high resolution digital images. Additionally, the expansion in wireless and wireline networking as well as network connection speeds allows users to access large libraries of images stored remotely over networks. Digital camera capabilities have also been dramatically improved to allow users to capture of high resolution images that take advantage of the expanded power and storage capacity of modern computing devices. Further, many mobile consumer electronic devices, such as mobile phones, now include integrated digital cameras allowing users to readily capture and store digital images.

Consequently, more and more people use electronic devices comprising digital cameras with great frequency in their everyday lives. Therefore the quantity and the variety of digital images produced by computing devices have greatly increased in recent years and are expected to continue to dramatically increase in the years to come. Some image management techniques have attempted to facilitate management of the vast number of digital images stored by and/or accessible to users. One of the key technologies in image management is image retrieval. The functionality of image retrieval is to provide a user with images related to his request.

BRIEF SUMMARY OF SOME EXAMPLES OF THE INVENTION

Methods, apparatuses, and computer program products are herein provided for facilitating image management and, more particularly, for facilitating content-based image retrieval. In this regard, systems, methods, apparatuses, and computer program products are provided that may provide several advantages to computing devices and computing device users. Embodiments of the invention provide automatically generated recommended regions of interest (ROIs) within a selected target image. The recommended ROIs allow a user to more conveniently and quickly select one or more ROIs within a target image to specify as query criteria for retrieval of related images. Additionally, use of automatically recommended ROIs may improve searching speed and accuracy of search results. Some embodiments of the invention allow a user to select multiple ROIs across a plurality of different target images as query criteria for a single image retrieval search. Such embodiments of the invention allow a user to more fully construct query criteria and provide for generation of a more relevant set of search results in instances when none of the target images includes each of the ROI elements that the user wants retrieved images to include.

Some embodiments of the invention provide an ROI-based searching history analysis functionality configured to learn user input patterns and determine feedback on searching results to achieve customization and better searching results. The ROI-based searching history functionality is leveraged in such embodiments to improve ROI recommendations and/or search results. Some embodiments of the invention determine meaningful feedback beyond merely whether a result image is related to the query criteria that may improve the searching history analysis functionality. In this regard, some embodiments of the invention determine feedback on an ROI level such that feedback may be determined as to whether a result image is related to each individual target ROI selected as a component of the search criteria. This feedback may be used in subsequent searches to improve search results.

In a first example embodiment, a method is provided, which comprises determining a selected target image. The method of this embodiment further comprises generating a candidate region of interest set. The candidate region of interest set of this embodiment comprises one or more regions of interest within the target image. The method of this embodiment additionally comprises determining a recommended region of interest set. The recommended region of interest set of this embodiment comprises one or more recommended regions of interest selected from the candidate region of interest set based at least in part upon evaluation criteria, the evaluation criteria of this embodiment being determined based at least in part upon analysis of maintained region of interest-based searching history. The method of this embodiment also comprises providing the recommended region of interest set for user selection of one or more target regions of interest from the recommended region of interest set as query criteria for searching an image library for one or more result images.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least determine a selected target image. The at least one memory and stored computer program code are configured to, with the at least one processor, further cause the apparatus of this embodiment to generate a candidate region of interest set. The candidate region of interest set of this embodiment comprises one or more regions of interest within the target image. The at least one memory and stored computer program code are configured to, with the at least one processor, additionally cause the apparatus of this embodiment to determine a recommended region of interest set. The recommended region of interest set of this embodiment comprises one or more recommended regions of interest selected from the candidate region of interest set based at least in part upon evaluation criteria, the evaluation criteria of this embodiment being determined based at least in part upon analysis of maintained region of interest-based searching history. The at least one memory and stored computer program code are configured to, with the at least one processor, also cause the apparatus of this embodiment to provide the recommended region of interest set for user selection of one or more target regions of interest from the recommended region of interest set as query criteria for searching an image library for one or more result images.

In another example embodiment, a computer program product is provided. The computer program product of this embodiment includes at least one computer-readable storage medium having computer-readable program instructions stored therein. The program instructions of this embodiment comprise program instructions configured to determine a selected target image. The program instructions of this embodiment further comprise program instructions configured to generate a candidate region of interest set. The candidate region of interest set of this embodiment comprises one or more regions of interest within the target image. The program instructions of this embodiment additionally comprise program instructions configured to determine a recommended region of interest set. The recommended region of interest set of this embodiment comprises one or more recommended regions of interest selected from the candidate region of interest set based at least in part upon evaluation criteria, the evaluation criteria of this embodiment being determined based at least in part upon analysis of maintained region of interest-based searching history. The program instructions of this embodiment also comprise program instructions configured to provide the recommended region of interest set for user selection of one or more target regions of interest from the recommended region of interest set as query criteria for searching an image library for one or more result images.

In another example embodiment, an apparatus is provided that comprises means for determining a selected target image. The apparatus of this embodiment further comprises means for generating a candidate region of interest set. The candidate region of interest set of this embodiment comprises one or more regions of interest within the target image. The apparatus of this embodiment additionally comprises means for determining a recommended region of interest set. The recommended region of interest set of this embodiment comprises one or more recommended regions of interest selected from the candidate region of interest set based at least in part upon evaluation criteria, the evaluation criteria of this embodiment being determined based at least in part upon analysis of maintained region of interest-based searching history. The apparatus of this embodiment also comprises means for providing the recommended region of interest set for user selection of one or more target regions of interest from the recommended region of interest set as query criteria for searching an image library for one or more result images.

In another example embodiment, a computer-readable storage medium carrying computer-readable program instructions is provided. The computer-readable program instructions comprise program instructions configured to determine a selected target image. The computer-readable program instructions further comprise program instructions configured to generate a candidate region of interest set, the candidate region of interest set comprising one or more regions of interest within the target image. The computer-readable program instructions additionally comprise program instructions configured to determine a recommended region of interest set, the recommended region of interest set comprising one or more recommended regions of interest selected from the candidate region of interest set based at least in part upon evaluation criteria, the evaluation criteria being determined based at least in part upon analysis of maintained region of interest-based searching history. The computer-readable program instructions also comprise program instructions configured to provide the recommended region of interest set for user selection of one or more target regions of interest from the recommended region of interest set as query criteria for searching an image library for one or more result images.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
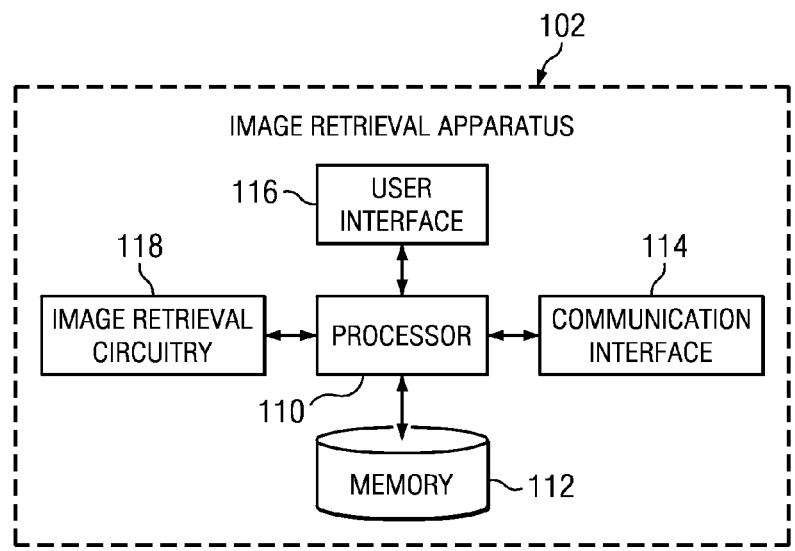
FIG. 1 illustrates a block diagram of an image retrieval apparatus for facilitating content-based image retrieval according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

One image retrieval technique is Content-Based Image Retrieval (CBIR), which allows a user to input an image or section thereof as a target image. A CBIR system may then analyze the content of the target image and search in an image database to identify result images related to the target image. The analyzed 'content' includes the information that can be derived from the images, such as, for example, colors, textures, shapes, other global features, other local features, and/or the like.

FIG. 1 illustrates a block diagram of an image retrieval apparatus 102 for facilitating content-based image retrieval according to an example embodiment of the present invention. It will be appreciated that the image retrieval apparatus 102 is provided as an example of one embodiment of the invention and should not be construed to narrow the scope or spirit of the invention in any way. In this regard, the scope of the invention encompasses many potential embodiments in addition to those illustrated and described herein. As such, while FIG. 1 illustrates one example of a configuration of an image retrieval apparatus for facilitating content-based image retrieval, numerous other configurations may also be used to implement embodiments of the present invention.

The image retrieval apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the image retrieval apparatus 102 is embodied as a mobile terminal, such as that illustrated in FIG. 2.

Figure 2:
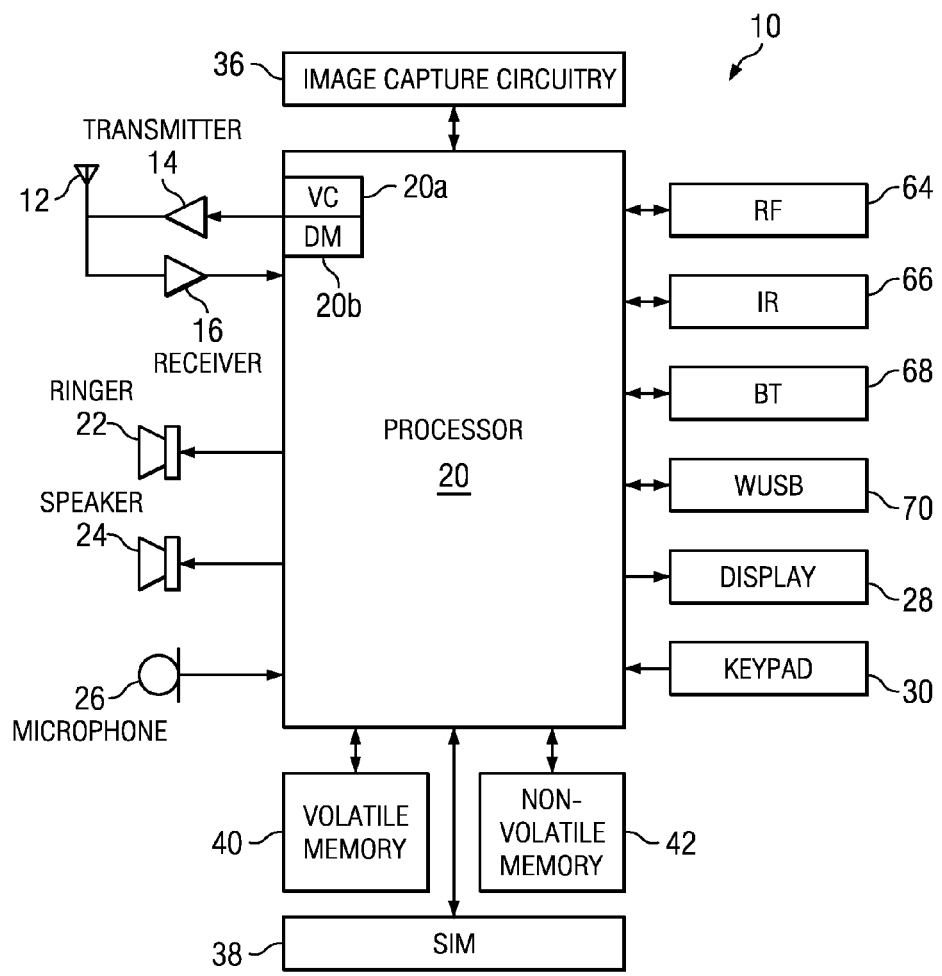
FIG. 2 is a schematic block diagram of a mobile terminal according to an example embodiment of the present invention.

In this regard, FIG. 2 illustrates a block diagram of a mobile terminal 10 representative of one embodiment of an image retrieval apparatus 102 in accordance with embodiments of the present invention. It should be understood, however, that the mobile terminal 10 illustrated and hereinafter described is merely illustrative of one type of image retrieval apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

In an exemplary embodiment, the mobile terminal 10 may include a media capturing element, such as a camera, video and/or audio module, in communication with the processor 20. The media capturing element may be any means for capturing an image, video and/or audio for storage, display or transmission. For example, in an exemplary embodiment in which the media capturing element comprises image capture circuitry 36, the image capture circuitry 36 may include a digital camera configured to form a digital image file from a captured image. In addition, the digital camera of the image capture circuitry 36 may be configured to capture a video clip. As such, the image capture circuitry 36 may include all hardware, such as a lens or other optical component(s), and software necessary for creating a digital image file from a captured image as well as a digital video file from a captured video clip. Alternatively, the image capture circuitry 36 may include only the hardware needed to view an image, while a memory device of the mobile terminal 10 stores instructions for execution by the processor 20 in the form of software necessary to create a digital image file from a captured image. As yet another alternative, an object or objects within a field of view of the image capture circuitry 36 may be displayed on the display 28 of the mobile terminal 10 to illustrate a view of an image currently displayed which may be captured if desired by the user. In an exemplary embodiment, the image capture circuitry 36 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (MEI) code, capable of uniquely identifying the mobile terminal 10.

Returning to FIG. 1, in an example embodiment, the image retrieval apparatus 102 includes various means, such as a processor 110, memory 112, communication interface 114, user interface 116, and image retrieval circuitry 118 for performing the various functions herein described. These means of the image retrieval apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the image retrieval apparatus 102 as described herein. The plurality of processors may be embodied on a single computing device or distributed across a plurality of computing devices collectively configured to function as the image retrieval apparatus 102. In embodiments wherein the image retrieval apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the image retrieval apparatus 102 to perform one or more of the functionalities of the image retrieval apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the image retrieval apparatus 102. In various embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the image retrieval apparatus 102 is embodied as a mobile terminal 10, the memory 112 may comprise the volatile memory 40 and/or the non-volatile memory 42. The memory 112 may be configured to store information, data, applications, instructions, or the like for enabling the image retrieval apparatus 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, an image library including one or more images. This stored information may be stored and/or used by image retrieval circuitry 118 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to an entity. For example, the communication interface 114 may be configured to communicate with a remote computing device storing an image library to search for images within the remotely stored image library related to query criteria selected by a user of the image retrieval apparatus 102. As another example, in embodiments wherein the image retrieval apparatus 102 comprises a server, network node, or the like, the communication interface 114 may be configured to communicate with a remote user terminal to allow a user of the remote user terminal to access functionality provided by the image retrieval apparatus 102. In at least one embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the image retrieval apparatus 102 and one or more remote computing devices are in communication. The communication interface 114 may additionally be in communication with the memory 112, user interface 116, and/or image retrieval circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the image retrieval apparatus 102 is embodied as one or more servers, aspects of the user interface 126 may be reduced or the user interface 126 may even be eliminated. The user interface 116 may be in communication with the memory 112, communication interface 114, and/or image retrieval circuitry 118, such as via a bus.

The image retrieval circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the image retrieval circuitry 118 is embodied separately from the processor 110, the image retrieval circuitry 118 may be in communication with the processor 110. The image retrieval circuitry 118 may further be in communication with one or more of the memory 112, communication interface 114, or user interface 116, such as via a bus.

The image retrieval circuitry 118 may be configured to cause a graphical user interface to be displayed on a display in operative communication with the image retrieval apparatus 102. Such a display may, for example, comprise an element of the user interface 116. As another example, such a display may comprise a display of a remote computing device in communication with the image retrieval apparatus 102 by which a user is accessing image retrieval services provided by the image retrieval apparatus 102. A user may utilize the graphical user interface to select a target image. Such a selection may be used via any input and selection means including, by way of example, by placing a cursor over a representation of a desired target image and selecting the desired target image with a mouse or other input means, touching a representation of a desired target image displayed on a touch screen display, and/or the like.

The image retrieval circuitry 118 may be configured to determine the selected target image. In response to determining the selected target image, the image retrieval circuitry 118 may be configured to generate a candidate region of interest set comprising one or more ROIs within the target image. The image retrieval circuitry 118 may be configured to generate the candidate region of interest set using any method for identifying ROIs. As an example, the image retrieval circuitry 118 may be configured to utilize a feature detection algorithm to identify and extract local features, such as, for example, corners, junctions, interest points, edges, blobs, regions, invariant regions, and/or the like in the target image. In identifying and extracting local features, the image retrieval circuitry 118 may be configured to determine properties of the local features, such as, for example, coordinates, scales, rotations, shapes, and/or the like of the identified local features. The image retrieval circuitry 118 may be further configured to determine a feature descriptor for an extracted local feature. The feature descriptor may comprise a feature vector generated according to the set of image pixels comprising the extracted local feature. Example algorithms that may be utilized by the image retrieval circuitry 118 for identifying and/or determining properties of local features within an image include SIFT (Scale Invariant Feature Transform), SURF (Speeded Up Robust Features), Shape Context, GLOH (Gradient Location and Orientation Histogram), steerable filters, PCA (Principal Components Analysis)-SIFT, differential invariants, spin images, complex filters, moment invariants, and/or the like. It will be appreciated, however, that embodiments of the invention are not limited to any specific method or algorithm for identifying and/or determining properties of local features.

The image retrieval circuitry 118 may be configured to analyze the extracted local features, such as by analyzing determined descriptions, feature descriptors, and/or the like, to generate the candidate ROI set. In this regard, the image retrieval circuitry 118 may be configured to treat each of a subset of the extracted local features as an ROI in the generated candidate ROI set. Additionally or alternatively, the image retrieval circuitry 118 may be configured to compute the distribution of the extracted local features in the target image and identify regions having a relatively high density of local features. In this regard, the image retrieval circuitry 118 may be configured to analyze the patterns of distribution of the extracted local features and group a plurality of local features as an ROI and acid the ROI to the generated candidate ROI set. The image retrieval circuitry 118 may be configured to consider a significance of the local features when generating the candidate ROI set.

Additionally or alternatively, the image retrieval circuitry 118 may be configured to use image segmentation to partition the target image into a plurality of regions. The image retrieval circuitry 118 may accordingly generate a candidate ROI set comprising one or more segmented regions of the target image. The image retrieval circuitry 118 may be further configured to generate the candidate ROI set at least in part by detecting and/or considering human attention mechanisms. For example, the image retrieval apparatus 102 may be coupled to a camera, eye movement detection device, or other means by which the image retrieval circuitry 118 may be able to monitor and detect eye movement of a user when viewing the target image. Accordingly, region(s) of the target image which the user's eyes are attracted to and/or focus on may be determined to comprise ROIs that are added to the candidate ROI set. In some embodiments, the target image may be associated with a set of statistics of monitored eye movement of a plurality of users that have previously viewed the target image, which may be used by the image retrieval circuitry 118 to identify ROIs within the target image to add to the candidate ROI set.

An identified candidate ROI may represent a region in the target image that is distinctive and informative, therefore it is likely to be the very part that user really wants to search. The shape of an ROI may comprise any type of shape, such as, for example, a triangle, rectangle, other polygon, circle, ellipse, irregular shape, freehand form, and/or the like. In the figures and ensuing description, rectangles are used by way of example to indicate ROIs. However, it will be appreciated that rectangles are provided merely for purposes of illustrative example and not by way of limitation.

As the generated candidate set may contain many ROIs, it may be difficult for user to select a target ROI(s) from the set of candidate ROIs. Accordingly, the image retrieval circuitry 118 is configured in some embodiments of the invention to determine a recommended region of interest set comprising one or more recommended ROIs selected from the candidate ROI set. In this regard, the image retrieval circuitry 118 may be configured to provide a searching history analysis functionality by which an ROI-based searching history is maintained. The image retrieval circuitry 118 may use an evaluation criteria determined based at least in part upon the maintained ROI-based searching history to select one or more recommended ROIs. Recommended ROIs may be determined, for example, based on past user-selected target ROIs. In this regard, if a user has previously selected a candidate ROI as a target ROI for an image retrieval search and/or has previously selected an ROI that is similar to the candidate ROI or is of the same class or type as a candidate ROI, the image retrieval circuitry 118 may be configured to identify that candidate ROI as a recommended ROI. In another example, previously recommended ROIs for a target image (e.g., ROIs recommended when the target image was previously used as a basis for selecting query criteria for an image retrieval search) may be considered for selection as recommended ROIs. In still a further example, historical relationships between target ROIs and corresponding search result images (e.g., from previous image retrieval searches) may be considered to evaluate the quality of a candidate ROI with respect to its viability as a component of query criteria for an image retrieval search. Additionally or alternatively, the image retrieval circuitry 118 may be configured to identify recommended ROIs based at least in part on a quantity, concentration, arrangement, significance, and/or the like of local feature(s) within the candidate ROIs.

In some embodiments, the image retrieval circuitry 118 is configured to compute a recommendation score for each of a subset of the candidate ROIs in the candidate ROI set using the evaluation criteria. The image retrieval circuitry 118 may be configured to determine one or more recommended ROIs from the candidate ROI set based at least in part upon the computed recommendation scores. In this regard, the image retrieval circuitry 118 may, for example, be configured to select a predefined number of candidate ROIs having the best recommendation scores (e.g., the highest scores or lowest scores depending on how recommendation scores are evaluated) as recommended ROIs in the recommended ROI set. As another example, the image retrieval circuitry 118 may be configured to select candidate ROIs having a recommendation score above or below (e.g., depending on how recommendation scores are evaluated as to whether a higher or lower score indicates a candidate ROI is a better choice as a recommended ROI) a predefined threshold as recommended ROIs in the recommended ROI set. It will be appreciated, however, that the image retrieval circuitry 118 may leverage computed recommendation scores in additional or alternative ways when determining recommended ROIs within a target image.

Subsequent to determining the recommended ROI set, the image retrieval circuitry 118 may be configured to provide the recommended ROI set for user selection of one or more target ROIs as query criteria for searching an image library for one or more result images related to the query criteria. In this regard, the image retrieval circuitry 118 may, for example, be configured to cause selectable indications of the recommended ROIs to be displayed on a graphical user interface for facilitating CBIR in accordance with an embodiment of the invention. The selectable indications may, for example, comprise selectable displayed thumbnails of the recommended ROIs, highlighted/boxed region(s) of the selected target image overlying or concurrent with the recommended ROIs, selectable buttons corresponding to recommended ROIs, and/or the like.

FIG. 3 illustrates a series of images according to an example user interface for selecting one or more target ROIs from a target image according to an example embodiment of the invention. Referring now to FIG. 3*a*, a selected target image 302 is displayed in the user interface. FIG. 3*b* illustrates a plurality of recommended ROIs within the target image 302. The recommended ROIs may comprise a recommended ROI set generated by the image retrieval circuitry 118 as previously described. In this regard, FIG. 3*b* illustrates recommended ROIs 304, 306, and 308 as indicated by highlighted boxes enclosing the ROIs within the target image 302. In the embodiment of FIG. 3, thumbnails of the recommended ROIs 304, 306, and 308 are also displayed within a region 310 displaying the recommended ROIs. In addition to the recommended ROIs 304, 306, and 308, a thumbnail of the target image 302 is also displayed in the region 310 as a recommended ROI. In this regard, in some embodiments of the invention, the image retrieval circuitry 118 is configured to include the entirety of a selected target image as a recommended ROI within the recommended ROI set generated for the target image. As illustrated in the region 310, the thumbnails of the respective recommended ROIs are numbered 1-4. These numbers correspond to the numbered buttons 312. Accordingly, a user may select one of the numbered buttons in order to select a recommended ROI as a target ROI. Such selection may be made using any input means including, for example, touch an appropriate button using an appropriate touch gesture on a touch screen display on which the graphical user interface is displayed, selecting an appropriate button using a cursor via a mouse or other input means of the user interface 116, and/or the like. Thumbnails or other indication of selected ROIs may be displayed in the selected ROI region 314. In FIG. 3*b*, the user has selected the recommended ROI 308 and a thumbnail of the ROI 308 is displayed within the selected ROI region 314.

Figure 3A:
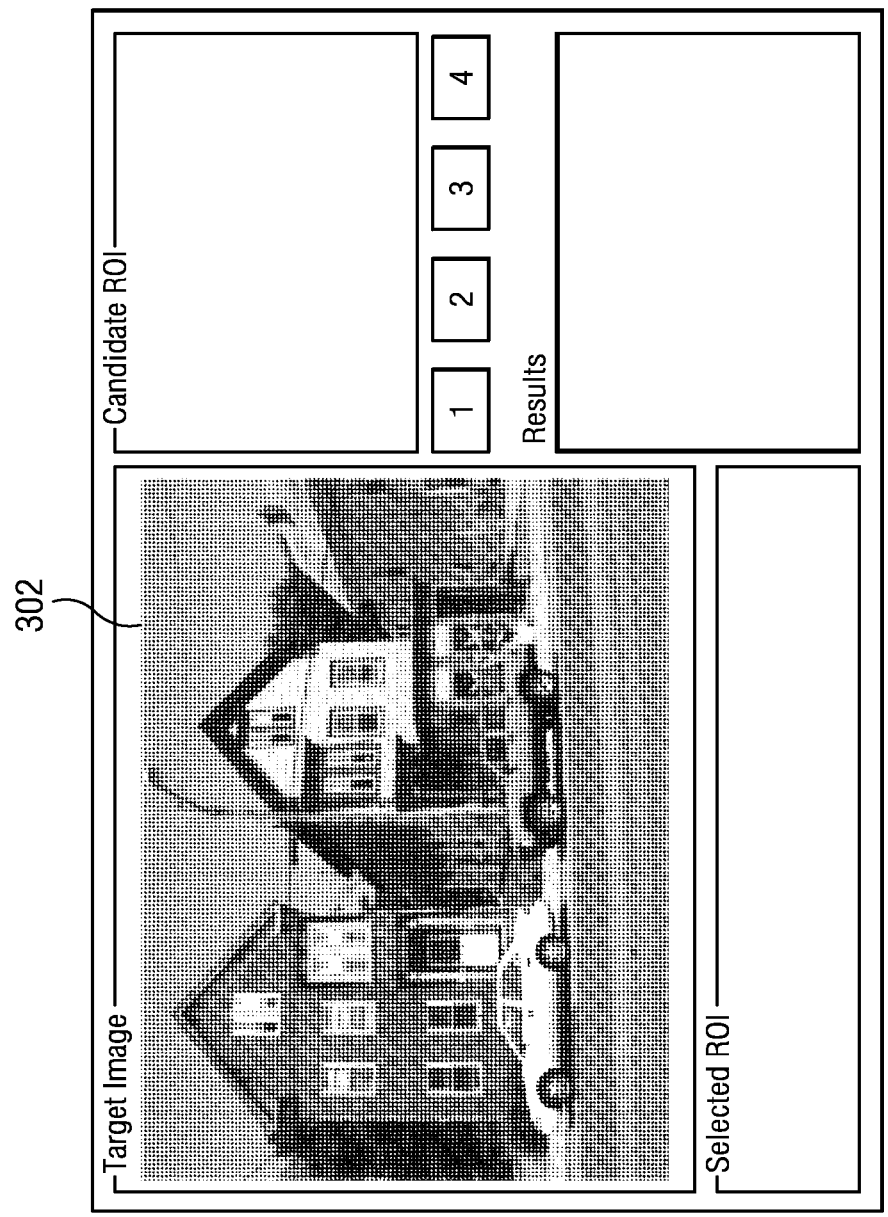
FIG. 3 illustrates a series of images according to an example user interface for selecting one or more target ROIs from a target image according to an example embodiment of the invention.
Figure 3B:
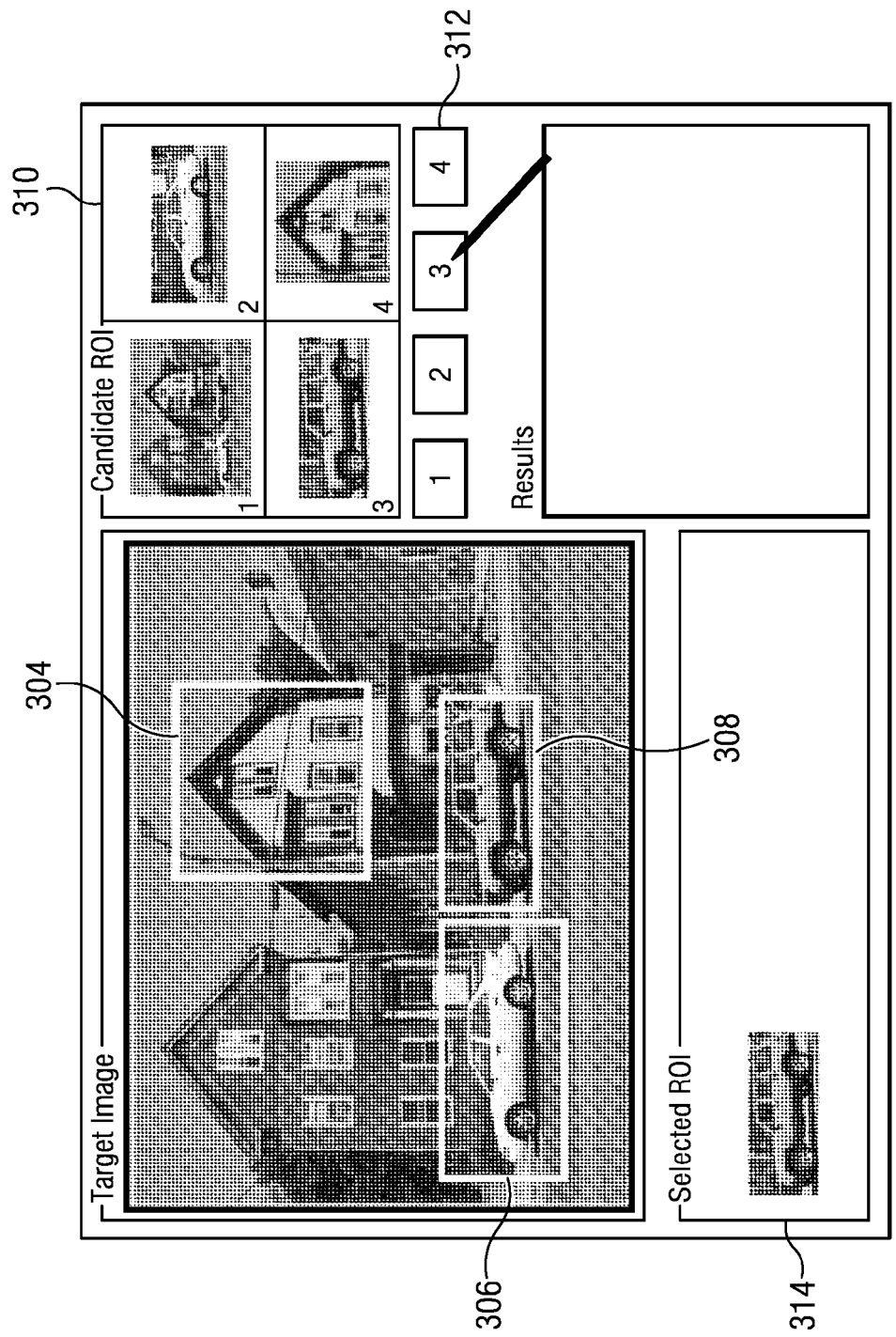
Figure 3C:
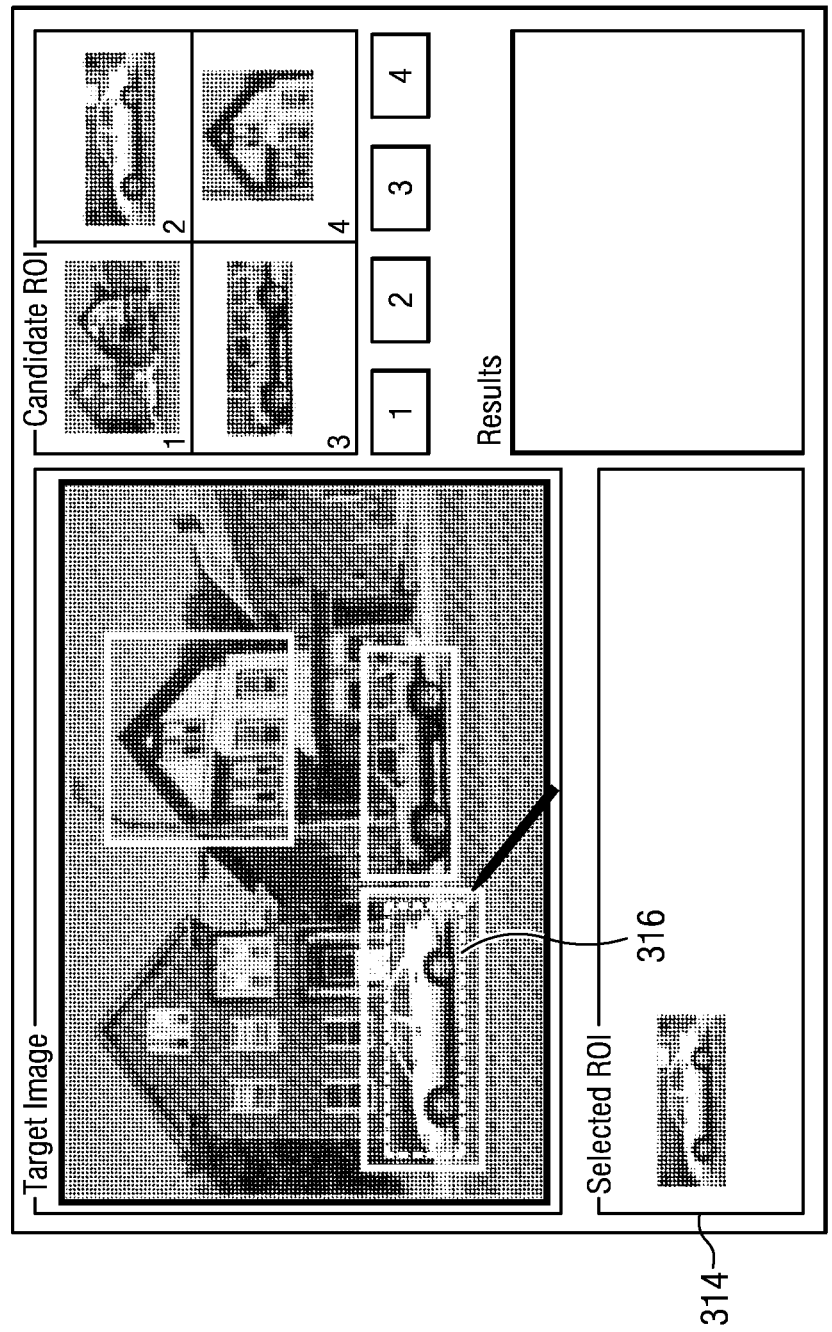

Referring now to FIG. 3*c*, the user may wish to select the car displayed within the recommended ROI 306 as a target ROI. However, the user may feel that the recommended ROI is too large and may encompass features undesirable to include as query criteria or that may otherwise yield results in an image retrieval search that are not as accurate. Accordingly, the user may be able to adjust the size of the recommended ROI by editing the defined boundary. Additionally or alternatively, the user may be able to draw or otherwise select a new ROI having the boundary desired by the user. Such a new or adjusted ROI is indicated by the rectangle 316 having the dashed-line border in FIG. 3*c*.

Figure 3D:
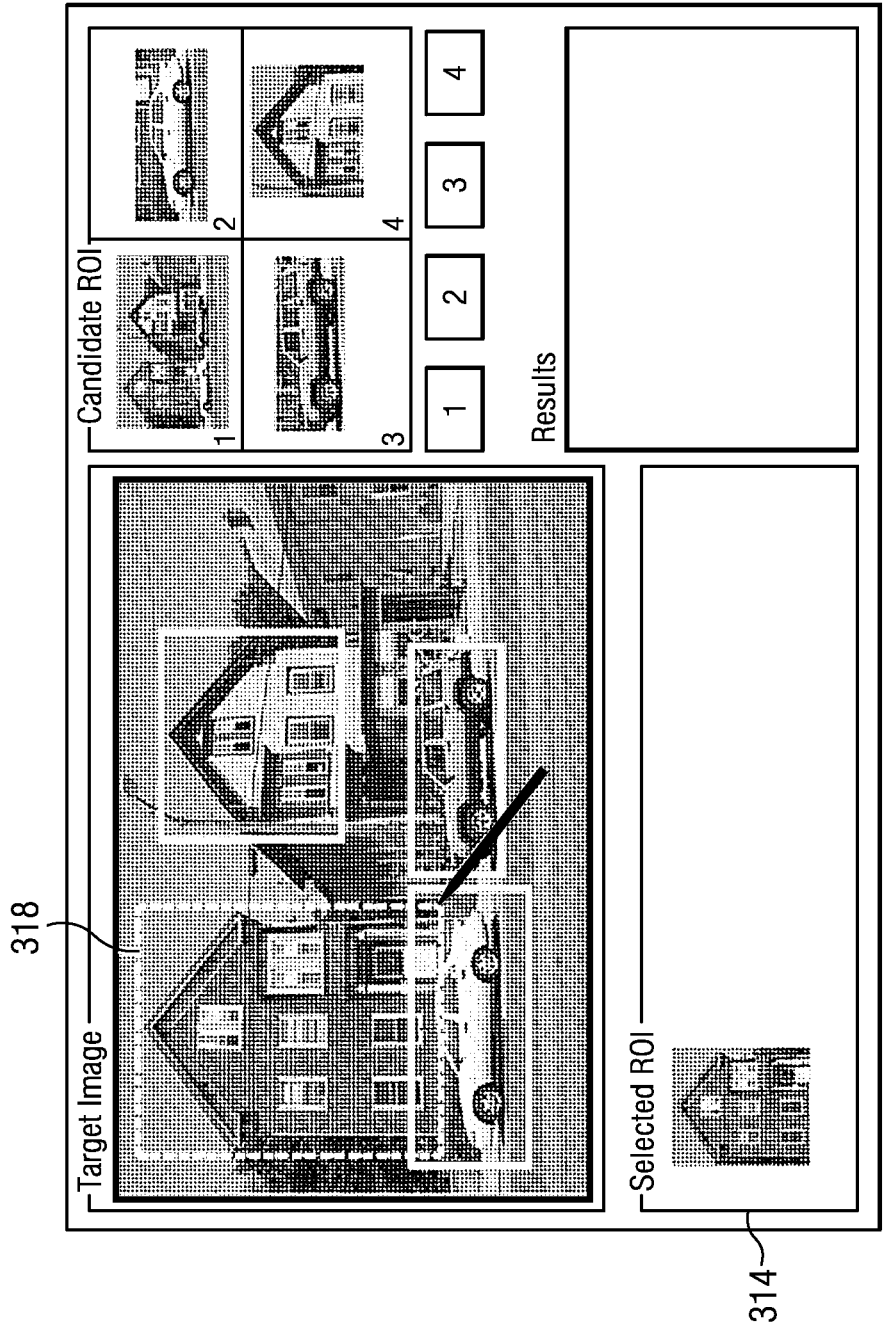

In some instances, an ROI that the user wishes to select as a target ROI may not be provided as a recommended ROI. Accordingly, a user may desire to define a new ROI encompassing the desired region. Referring now to FIG. 3*d*, the user has defined an ROI 318 encompassing the grey house on the left side of the target image 302. The image retrieval circuitry 118 may be configured to determine the boundaries of such a user-defined ROI and add the user-defined ROI as a selected target ROI when selected by the user. In FIG. 3*d*, a thumbnail representation of the user-defined ROI 318 is displayed in the selected ROI region 314 of the graphical user interface so as to indicate the ROI 318 has been selected as a target ROI.

Figure 3E:
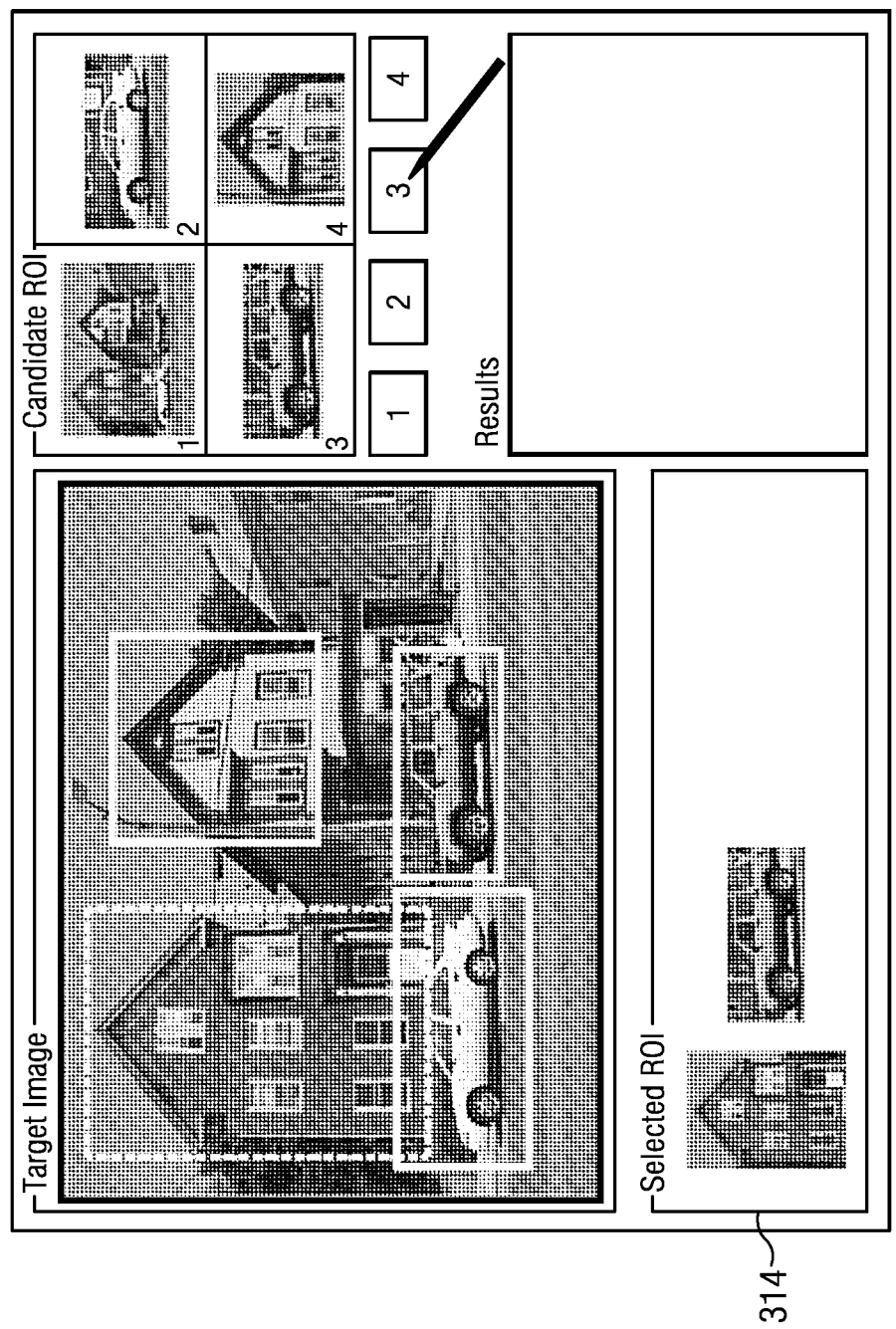

It will be appreciated that embodiments of the invention do not limit a user to selecting single target ROI. In this regard, some embodiments of the invention allow a user to select a plurality of ROIs as target ROIs to define query criteria for a content-based image retrieval search. Referring to FIG. 3*e*, two ROIs have been selected and thumbnail indications of the selected ROIs are displayed within the selected ROI region 314.

Figure 4:
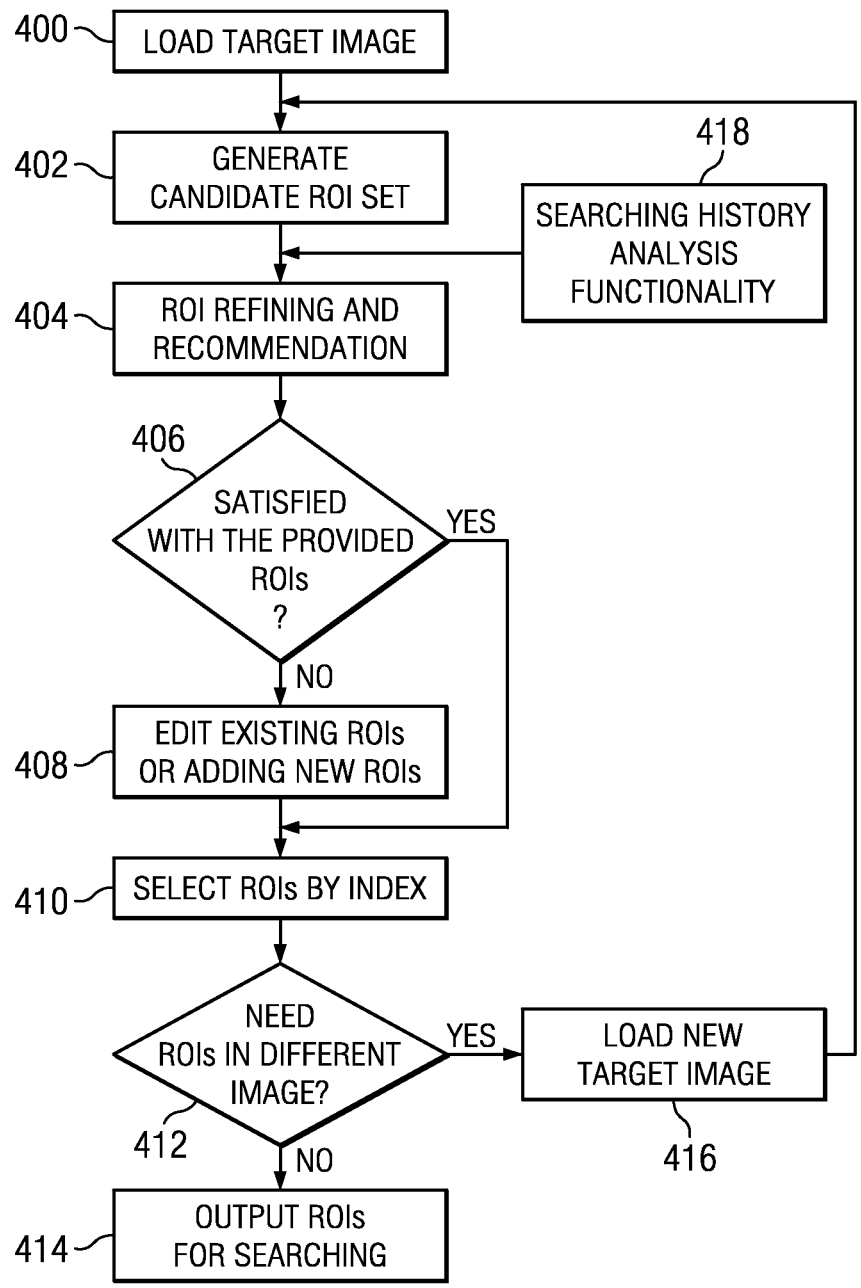
FIG. 4 illustrates a flowchart according to an example method for facilitating selection of target regions of interest from a plurality of target images according to an example embodiment of the invention.

By some embodiments of the invention, ROIs selected as target ROIs are not limited to being contained within a single target image. In this regard, some embodiments of the invention allow a user to select one or more target ROIs from each of a plurality of target images. Such embodiments enable a user to better define query criteria in instances in which a user wants to retrieve result images having a plurality of features or elements which are not all contained within any one target image. FIG. 4 illustrates a flowchart according to an example method for facilitating selection of target regions of interest from a plurality of target images according to an example embodiment of the invention.

Referring now to FIG. 4, operation 400 may comprise the image retrieval circuitry 118 determining a selected target image and loading the target image. Operation 402 may comprise the image retrieval circuitry 118 generating a candidate ROI set. The image retrieval circuitry 118 may refine the candidate ROI set by generating a recommended ROI set, at operation 404. The image retrieval circuitry 118 may generate the recommended ROI set using evaluation criteria determined based at least in part using searching history analysis functionality, at operation 418. The image retrieval circuitry 118 may provide the recommended ROI set to the user for review and/or selection. Operation 406 may comprise the user reviewing the provided recommended ROIs to determine whether the user is satisfied with the recommended ROIs. If the user is not satisfied, the user may edit the boundaries of existing recommended ROIs and/or define new ROIs, at operation 408. Operation 410 may comprise the user selecting one or more ROIs as target ROIs. The user may, for example, make a selection by selecting a numbered button (e.g., one of the numbered buttons 312) or key corresponding to an index number of a desired ROI. It will be appreciated, however, that indexing letters may, for example, be used in addition to or in lieu of indexing numbers. At Operation 412, the user may determine whether the user needs to select a target ROI(s) from another target image in order to define the desired query criteria. If the user does need to select a target ROI from another target image, then the user may select a new target image. The image retrieval circuitry 118 may be configured to determine selection of the new target image and load the new target image, at operation 416. The method may then return to operation 402. Once the user has selected all of the desired ROIs to define the desired query criteria, the image retrieval circuitry 118 may be configured to output and/or utilize the selected target ROIs for searching, at operation 414.

In some embodiments, a user may assign an importance factor to one or more selected target ROIs. The importance factor(s) may, for example, be automatically assigned by the image retrieval circuitry according to the order in which the target ROIs were selected. Alternatively, a user may explicitly define an importance factor for a selected target ROI, such as by assigning an indication of relative importance among the selected target ROIs (e.g., most important, second most important, least important, and/or the like). In another example, the user may define an importance factor category (e.g., very important, somewhat important, not very important, and/or the like) for a selected target ROI. When searching for images related to the target ROIs as described further herein, the image retrieval circuitry 118 may be configured to take into account assigned importance factors. For example, if a target ROI has a high importance factor then the candidate result images related with this target ROI may have a higher possibility to be chosen as the final results.

In response to the user finalizing selection of desired target ROIs and/or otherwise initiating a search, the image retrieval circuitry 118 may be configured to construct a query criteria based on the selected target ROI(s) and search at least a portion of an image library for one or more result images using the constructed query criteria. In this regard, the image retrieval circuitry 118 may search for images related to the query criteria (e.g., related to the selected target ROI(s)). The image library may comprise a database of images, collection of images stored in a defined location(s) (e.g., in one or more defined folders), every image file stored in the memory 112 and/or a storage device(s) accessible to the image retrieval apparatus 102, and/or the like. The image library or portion thereof searched may be defined by a user when initiating a search or may comprise a default image library.

The image retrieval circuitry 118 may be configured to search for images related to the query criteria using any algorithm or method that may be used for content-based image retrieval or a combination of multiple algorithms or methods. As one example, the image retrieval circuitry 118 may be configured to compute feature descriptions for images and/or ROIs within the images stored in the image library to be searched. These feature descriptions may be calculated at the time of search. Additionally or alternatively, the feature descriptions for images within the image library may be calculated prior to the search so as to reduce search time. The image retrieval circuitry 118 may be further configured to compute the feature descriptions for the target ROIs that comprise the query criteria, if not already calculated. The image retrieval circuitry 118 may compare the feature descriptions for the target ROIs with the feature descriptions for the images within the image library. A similarity measure may be used by the image retrieval circuitry 118 for determining images related to the query criteria. As an example, the similarity measure may comprise a Euclidean or Mahalanobis distance between feature vectors defining the feature descriptions. It will be appreciated, however, that these similarity measures are provided merely for purposes of example and embodiments of the invention may utilize any appropriate similarity measure or combination of a plurality of similarity measures. After identifying one or more result images determined to be related to the query criteria, the image retrieval circuitry 118 may be configured to provide the identified result images for review by a user, such as, for example, by causing the identified result images or representations thereof to be displayed on a display.

Referring now to FIG. 5, FIG. 5 illustrates a series of images according to an example user interface for selecting target ROIs and performing image retrieval according to an example embodiment of the invention. FIG. 5*a* illustrates a user interface having a selected target image 502 displayed. The user interface illustrated in FIG. 5 and operation thereof is substantially similar to that described with respect to FIG. 3. As illustrated in FIG. 5*a*, one of the recommended ROIs provided by the image retrieval circuitry 118 is the ROI 504, which includes Yao Ming's face. A thumbnail 506 of the ROI 504 is illustrated in the region of the graphical interface for selecting target ROIs. The thumbnail 506 is labeled with the index "2." Accordingly, a user may select the ROI 504 as a target ROI by selecting the numbered button 508 corresponding to the index number "2." As illustrated in FIG. 5*a*, the ROI 504 has been selected and a representation of the ROI 504 is displayed in the selected ROI region 510 of the graphical user interface.

Figure 5A:
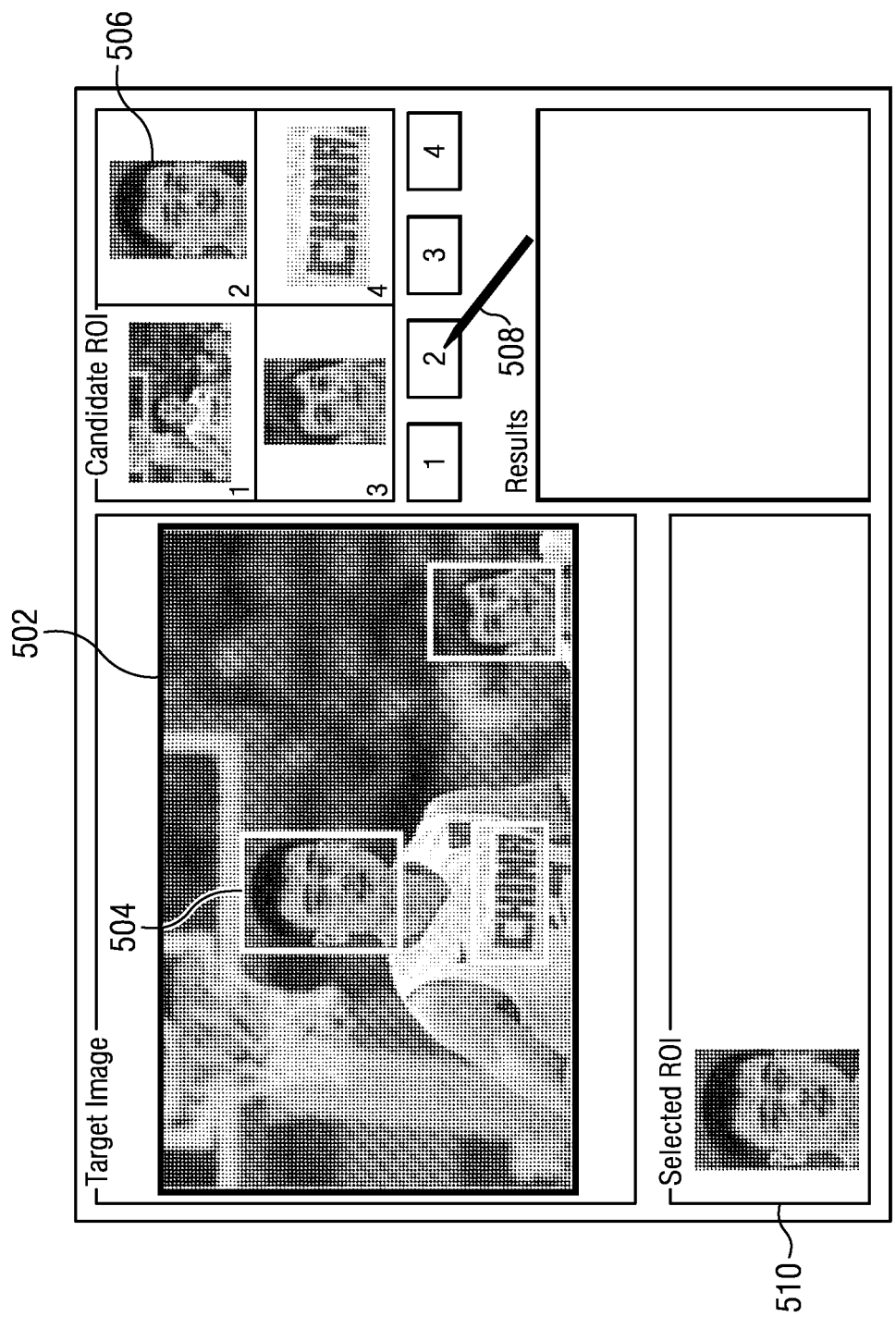
FIG. 5 illustrates a series of images according to an example user interface for selecting target ROIs and performing an image retrieval according to an example embodiment of the invention.
Figure 5B:
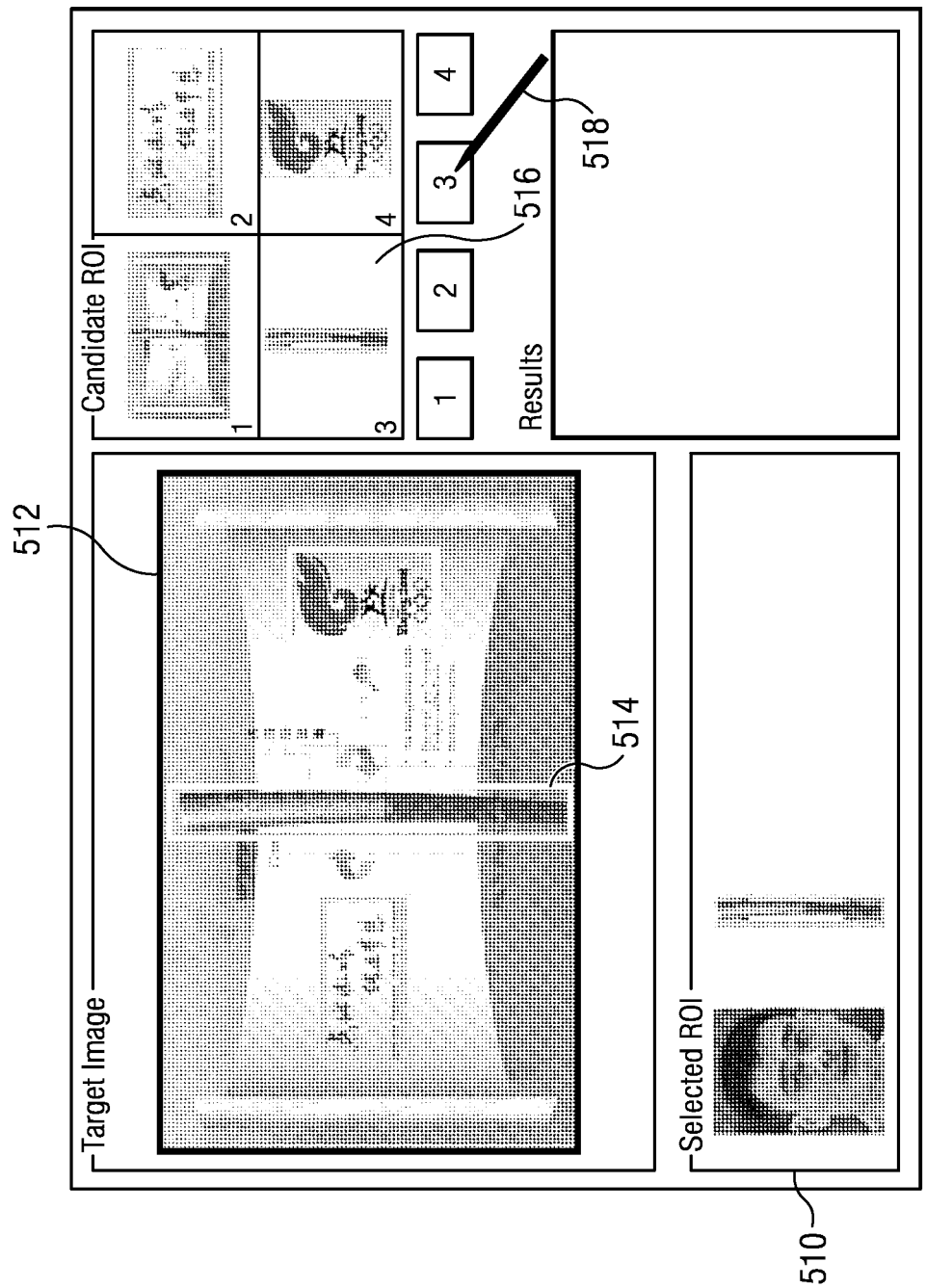

FIG. 5*b* illustrates a second selected target image 512 displayed in the user interface. As illustrated in FIG. 5*b*, one of the recommended ROIs provided by the image retrieval circuitry 118 is the ROI 514, which includes an image of an Olympic torch. A thumbnail 516 of the ROI 514 is illustrated in the region of the graphical interface for selecting target ROIs. The thumbnail 516 is labeled with the index "3." Accordingly, a user may select the ROI 514 as a target ROI by selecting the numbered button 518 corresponding to the index number "3." As illustrated in FIG. 5*ab* the ROI 514 has been selected and a representation of the ROI 514 is displayed in the selected ROI region 510 of the graphical user interface along with the representation of the previously selected ROI 504.

Figure 5C:
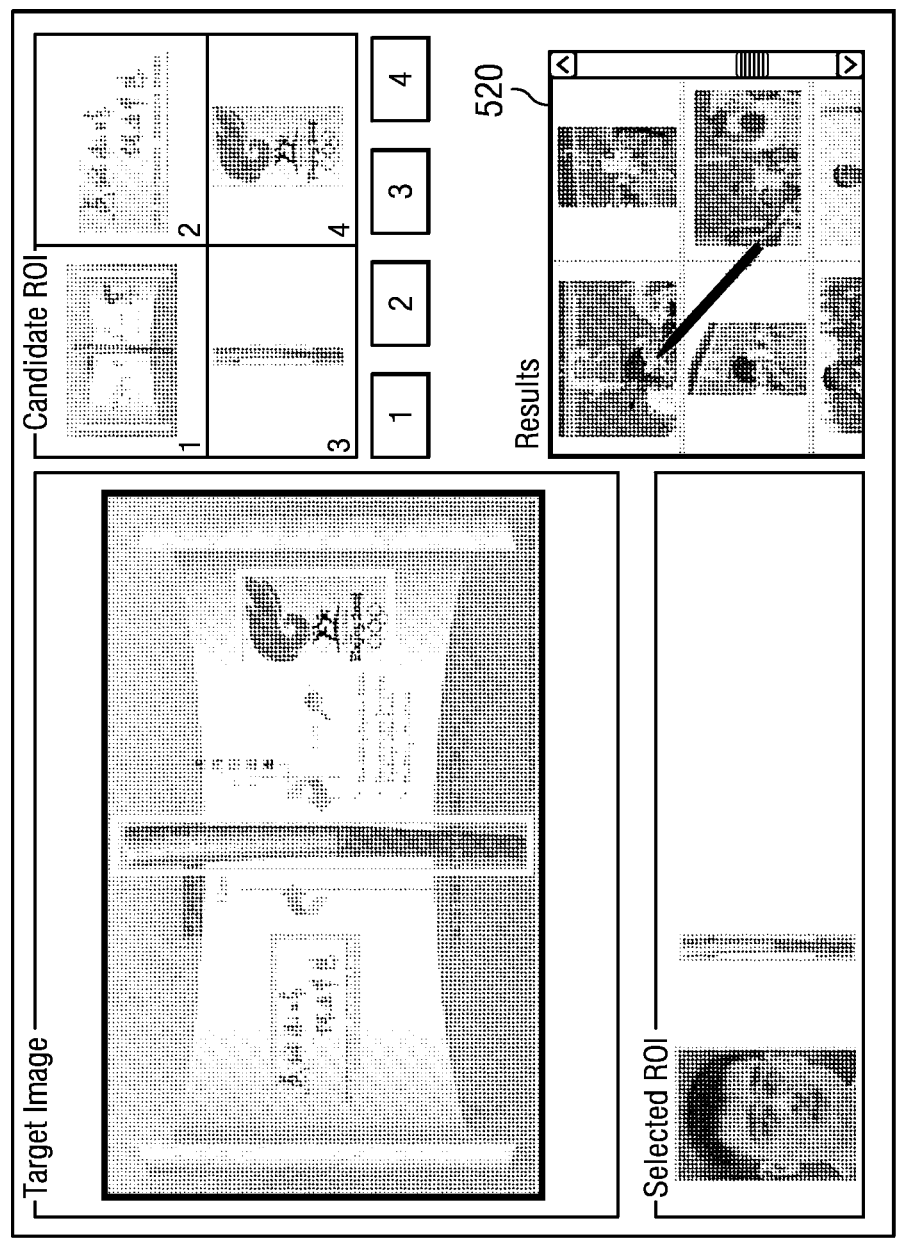
Figure 5D:
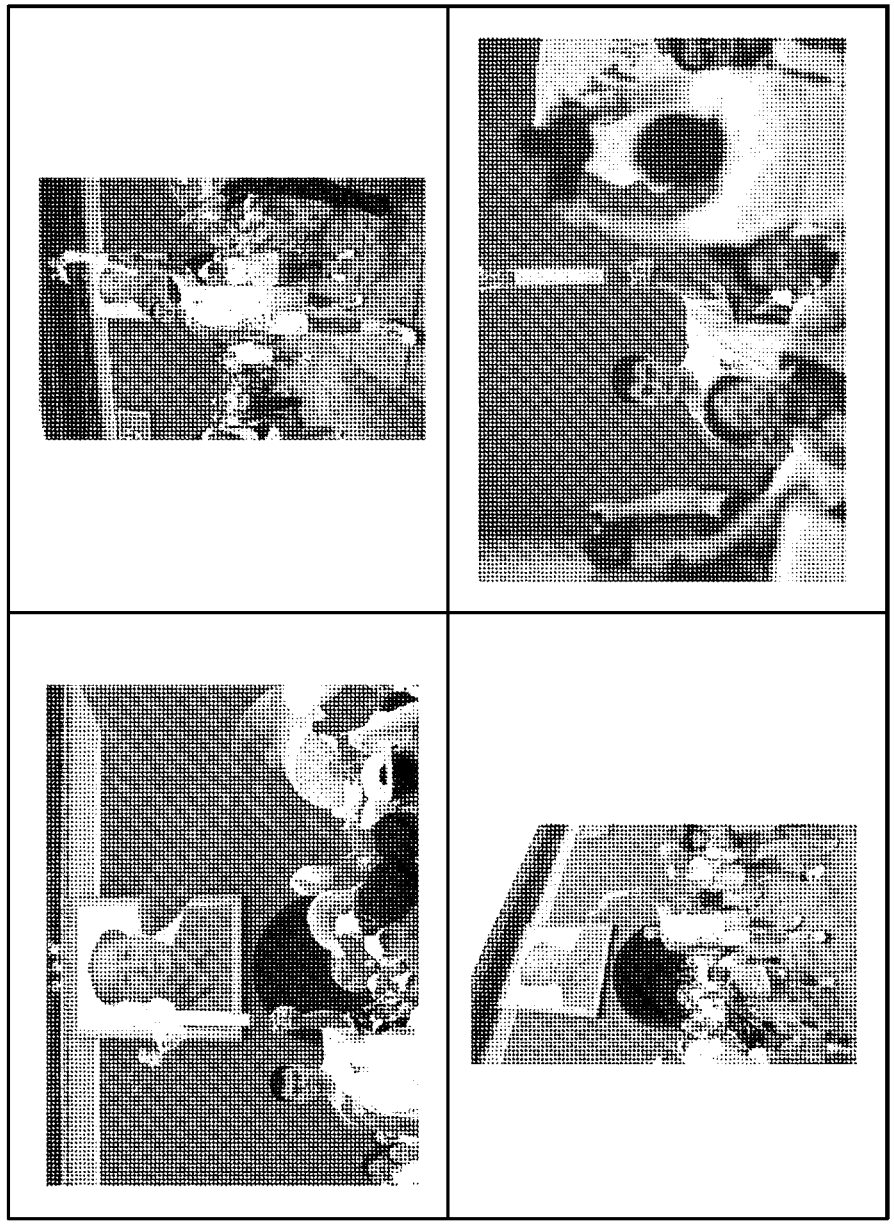

After the user has selected the two target ROIs, the user may initiate an image retrieval search. FIG. 5*c* illustrates result images that may be identified and retrieved by the image retrieval circuitry 118 as being related to the selected target ROIs. In the example user interface of FIG. 5, the result images are displayed in the results region 520 of the graphical user interface. FIG. 5*d* illustrates a zoomed in view of the contents of the results region 520. While FIG. 5 illustrates selection of target ROIs in two target images and performing an image retrieval search based on the target ROIs selected from the two target images, it will be appreciated that embodiments of the invention allow a user to select target ROIs as the basis of query criteria for an image retrieval search from more than two target images. Further, it will be appreciated that although FIG. 5 illustrates selection of a single target ROI from each target image, embodiments of the invention allow a user to select multiple target ROIs from a target image.

In some embodiments, the image retrieval circuitry 118 is configured to determine feedback on identified result images. The image retrieval circuitry 118 may utilize collected feedback to update maintained ROI-based searching history so as to improve searching history functionality provided by the image retrieval circuitry 118. In this regard, the feedback may be used by the image retrieval circuitry 118 to improve future ROI recommendation and future image retrieval searches.

In this regard, the image retrieval circuitry 118 may be configured to provide a feedback interface for a user when the user views a result image(s). The feedback interface may solicit an indication of whether the user is satisfied with a particular result image. In this regard, the user may enter feedback via the feedback interface as to whether the result image is related to the selected target ROIs. In some embodiments, the feedback interface allows a user to enter feedback with respect to occurrences of each selected target ROI in addition to general feedback as to whether the result image satisfies the query criteria. For example, if the user selected two ROIs, the feedback interface may allow the user to provide feedback on whether the result image relates to the first target ROI and whether the result image relates to the second target ROI. This ROI-level feedback may provide more meaningful ROI-based searching history information that may benefit the future searching task. In this regard, even when a result image is not exactly what user wants it may still contain some contents that user wants to see, in that the result image may be related to at least one of the selected target ROIs, but perhaps not all of the selected target ROIs. Therefore embodiments of the invention may determine ROI-level feedback that may provide information beyond simply whether a result image is "Good" or "Bad."

Figure 6A:
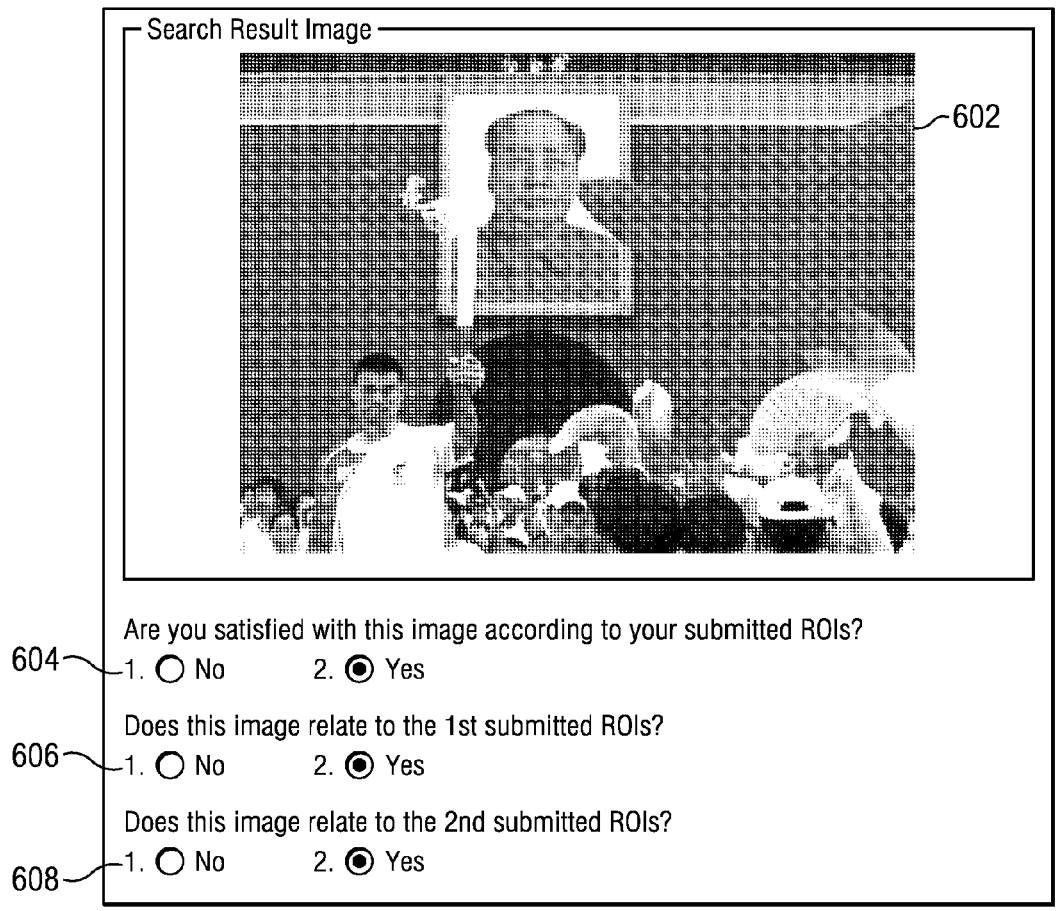
FIG. 6 illustrates an example feedback interface for providing feedback on result images according to an example embodiment of the invention.

FIG. 6 illustrates an example feedback interface for providing feedback on result images according to an example embodiment of the invention. In this regard, FIG. 6 illustrates an example feedback interface in the context of two result images that may be identified as being related to the target ROIs 504 and 514. The selected target ROIs 504 and 514 comprise an image of Yao Ming's face and an image of an Olympic torch, respectively. In this example, the user is searching for images of Yao Ming carrying the Olympic torch. Referring now to FIG. 6a, the feedback interface includes the result image 602, which includes an image of Yao Ming carrying the Olympic torch. Accordingly, the user has selected in answer to the feedback question 604 that he is satisfied with the result image according to the selected target ROIs. The user has further selected in response to the feedback question 606 that the image does relate to the first submitted target ROI (the ROI 504 including Yao Ming's face). The user has additionally selected in response to the feedback question 608 that the image does relate to the second submitted target ROI (the ROI 514 including the Olympic torch).

Figure 6B:
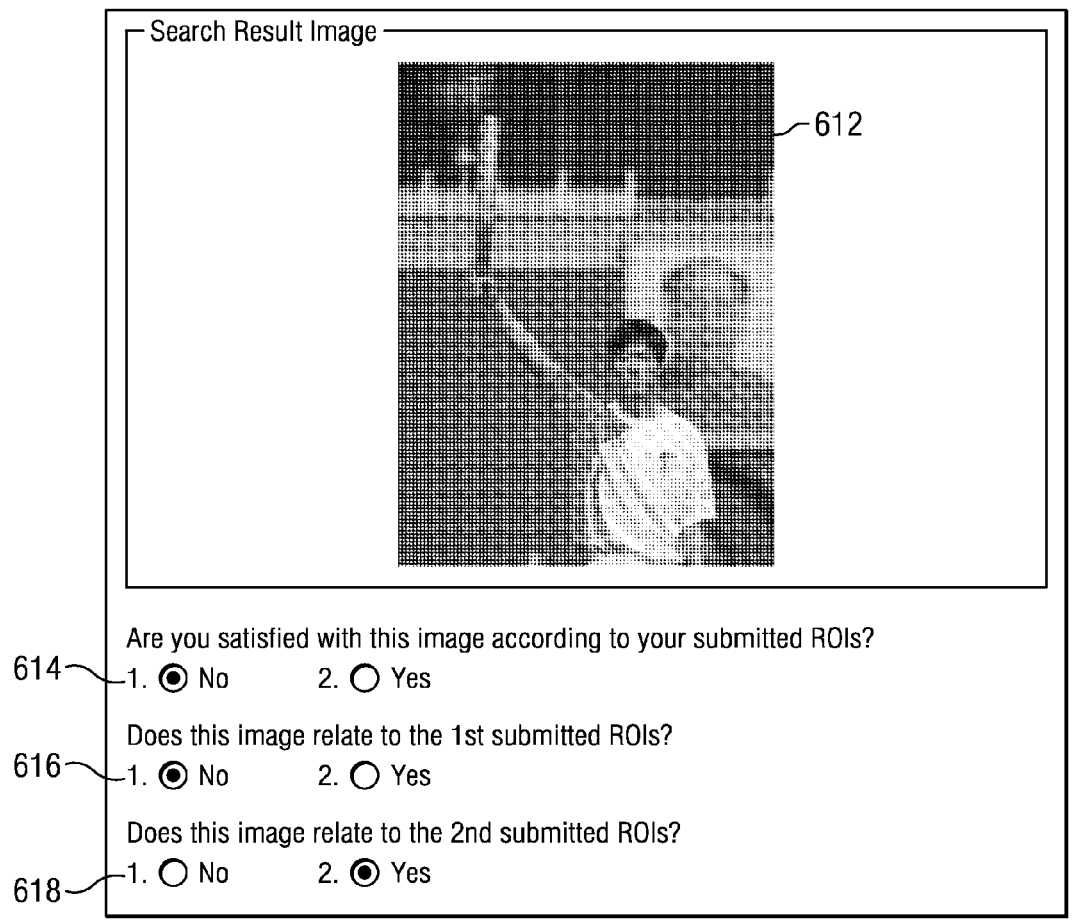

The feedback interface of FIG. 6b includes the result image 612, which includes an image of someone other than Yao Ming carrying the Olympic torch. Accordingly, the user has selected in answer to the feedback question 614 that he is not satisfied with the result image according to the selected target ROIs. The user has further selected in response to the feedback question 616 that the image does not relate to the first submitted target ROI (the ROI 504 including Yao Ming's face). However, the user has selected in response to the feedback question 618 that the image does relate to the second submitted target ROI (the ROI 514 including the Olympic torch).

It will be appreciated that in some embodiments of the invention, providing feedback may be optional to the user and thus the user may decline to provide feedback via a feedback interface or bypass the feedback interface. As another option, a user may be able to select an option to disable a feedback feature such that the user is not prompted with a feedback interface when browsing result images.

Figure 7:
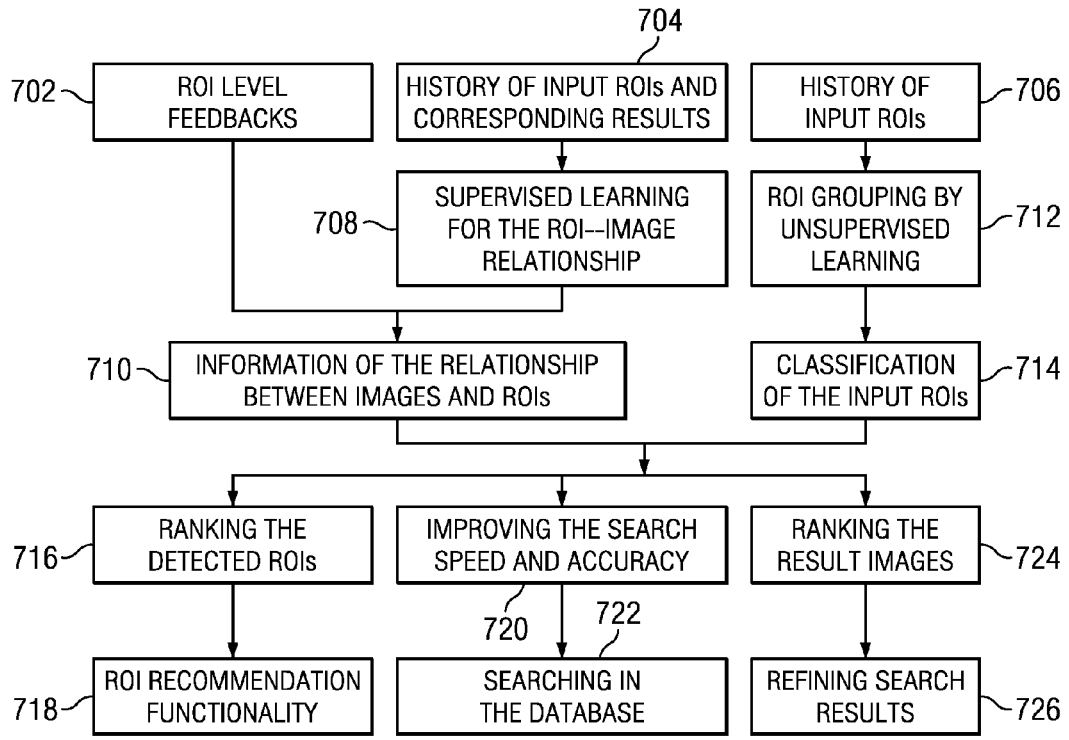
FIG. 7 illustrates a flow diagram of a searching history analysis functionality according to an example embodiment of the invention.

As described previously, in some embodiments, the image retrieval circuitry 118 is configured to provide a searching history analysis functionality comprising maintaining ROI-based searching history. Some embodiments of the searching history analysis functionality will be described with respect to FIG. 7, which illustrates a flow diagram of a searching history analysis functionality according to an example embodiment of the invention. The searching history analysis functionality may be based on learning and multi-cue evaluation strategy. The image retrieval circuitry 118 may be configured to analyze and leverage ROI-based searching history information maintained in accordance with the searching history analysis functionality to evaluate candidate ROIs in determining recommended ROIs for a target image and/or during a searching operation when identifying images related to a query criteria.

The image retrieval circuitry 118 may be configured to analyze information from a plurality of sources and update the maintained ROI-based searching history to include the analyzed information. In this regard, the image retrieval circuitry 118 may be configured to provide multi-cue searching history analysis. The image retrieval circuitry 118 may be configured to collect and update the maintained ROI-based searching history to include ROI-level feedbacks 702. In this regard, the image retrieval circuitry 118 may be configured to determine and collect user feedback on whether identified result images relate to one or more selected target ROIs, such as described above in connection with FIG. 6. ROI-level feedbacks offer information about which ROIs are contained in images and which ROIs are not contained in images such that subsequent searches may be improved based on information learned from feedback on previous search results.

The image retrieval circuitry 118 may be further configured to collect and update the maintained ROI-based searching history to include information about the history of selected target (e.g., input) ROIs and corresponding results 704. In this regard, the image retrieval circuitry 118 may be configured to analyze the relationship between selected target ROIs and corresponding search results to identify the possible ROI classes contained by an image. In some embodiments, this information may additionally or alternatively be determined through user feedbacks. The image retrieval circuitry 118 may be configured to analyze maintained statistical information detailing historic relationships between selected target ROIs and corresponding search results to help improve the accuracy of search results and accelerate the speed of searching procedure.

The image retrieval circuitry 118 may be additionally configured to collect and update the maintained ROI-based searching history to include information about the history of selected target (e.g., input) ROIs 706. In this regard, the image retrieval circuitry 118 may be configured to identify and learn patters of target ROI selection under an unsupervised learning process. The image retrieval circuitry 118 may be configured to identify and categorize selected target ROIs into classes based on ROI contents. For example, ROIs containing cars may comprise a class. The image retrieval circuitry 118 may be configured to maintain records of user preference for various classes, such as by maintaining a record of the numbers of selection for each of a plurality of classes. The image retrieval circuitry 118 may be configured to leverage this ROI class preference history when determining recommended ROIs within a selected target image such that the image retrieval circuitry 118 may be configured to identify a class of a candidate ROI and recommend the candidate ROI to the user if the candidate ROI is in a class which the user has demonstrated a previous interest in as indicated through the class preference history.

The image retrieval circuitry 118 may be configured to analyze and consolidate the collected ROI-based searching history to generate consolidated sets of information that may be leveraged for enhancing recommendation of ROIs in a selected target image and/or image retrieval searching. One such example consolidated set of information may comprise information of the relationship between images and ROIs 710. This consolidated set of information may be gathered through analysis of collected ROI-level feedbacks 702 and history of selected target ROIs and corresponding results 704. This analysis may include supervised learning for the ROI-image relationship 708 through collected information. Another example consolidated set of information may comprise classification of historically selected target (e.g., input) ROIs 714. The image retrieval circuitry 118 may be configured to perform this classification through ROI grouping by unsupervised learning 712, such as by classifying selected target ROIs and maintaining histogram data of the number of times ROIs from each of a plurality of ROI classes have been selected as target ROIs as previously described.

The image retrieval circuitry 118 may be configured to utilize this maintained ROI-based searching history to rank candidate ROIs detected within a selected target image 716. The ranking may be used by the image retrieval circuitry 118 when determining a recommended ROI set 718. For example, the image retrieval circuitry 118 may be configured, for a candidate ROI, to examine its frequency of being searched in the searching history and the possible number of corresponding images in the database. A candidate ROI with higher frequency of being searched and larger number of related images may be accorded a higher recommendation score. The image retrieval circuitry 118 may use this recommendation score to rank the candidate ROIs. The image retrieval circuitry 118 may utilize recommendation scores to enhance feature-based recommendation of candidate ROIs by taking into account the searching history.

The image retrieval circuitry 118 may be further configured to utilize maintained ROI-based searching history to enhance searching an image library for images related to query criteria. In this regard, the image retrieval circuitry 118 may utilize the maintained ROI-based searching history to improve the search speed and accuracy 720 when searching in a database 722 or other image library. For example, the image retrieval circuitry 118 may be configured to determine a class of a selected target ROI. The image retrieval circuitry 118 may further analyze the maintained ROI-based searching history to determine images within the image library known to comprise an ROI within the same class to determine the set of images within the image library that may correspond to the query criteria. The image retrieval circuitry 118 may then search the determined set of images that may correspond to the query criteria to identify any images corresponding to the query criteria. In this regard, searching speed and accuracy may be enhanced by narrowing the portion of the image library to be searched by excluding images known not to include an ROI within the same class as a selected target ROI.

The image retrieval circuitry 118 may be additionally configured to utilize maintained ROI-based searching history to rank result images 724 identified in an image retrieval search and/or refine search results 726. In this regard, the image retrieval circuitry 118 may be configured to filter a plurality of result images by filtering out any result images known from the maintained ROI-based searching history to not be related to one or more selected target regions of interest. For example, the image retrieval circuitry 118 may be configured to filter out the unrelated images by using the information from the ROI level feedback. In this regard, some images may be known to not be related to a given target ROI but may be identified as a potential related image by a feature-based algorithms. The image retrieval circuitry 118 may be configured to identify and filter out such images based on the maintained ROI-based searching history information. Accordingly, a user may be provided with better accuracy of searching results.

Figure 8:
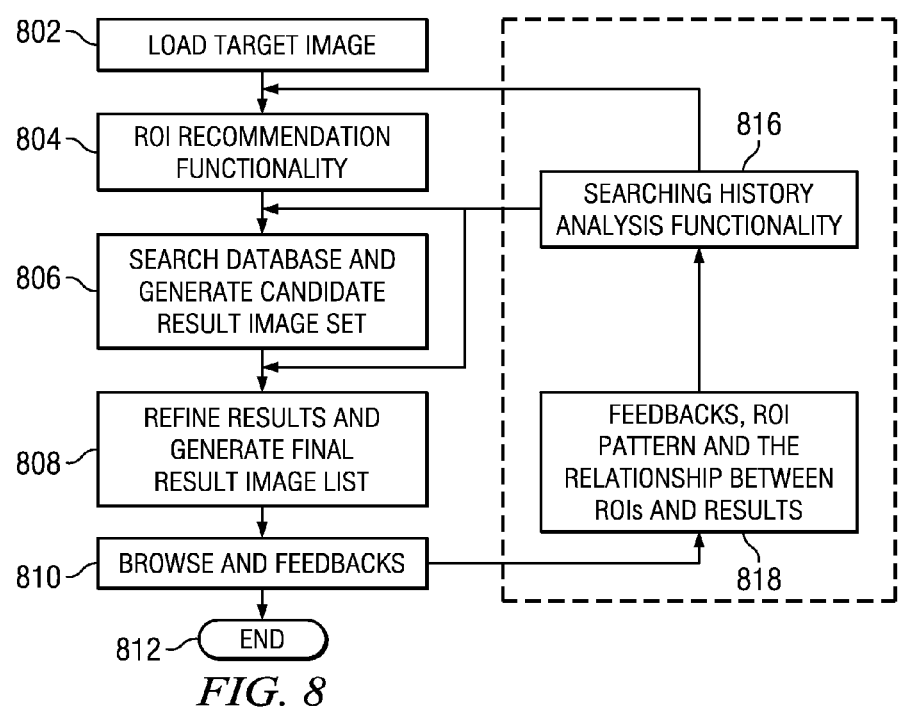
FIG. 8 illustrates a flowchart according to an example workflow for facilitating content-based image retrieval according to an example embodiment of the invention.

FIG. 8 illustrates a flowchart according to an example workflow for facilitating content-based image retrieval according to an example embodiment of the invention. Operation 802 may comprise the image retrieval circuitry 118 determining a selected target image and loading the target image. Operation 804 may comprise the image retrieval circuitry 118 determining recommended ROIs within the target image and providing the recommended ROIs to the user. Operation 804 may comprise utilizing searching history analysis 816 to improve the recommendations based on maintained ROI-based searching history, such as described in connection with elements 716 and 718 of FIG. 7. Operation 806 may comprise the image retrieval circuitry 118 searching a database or other image library for images related to a query criteria comprising one or more selected target ROIs and generating a candidate result image set. Operation 806 may comprise utilizing searching history analysis 816 to improve the search speed and accuracy based on maintained ROI-based searching history, such as described in connection with elements 720 and 722 of FIG. 7. Operation 808 may comprise the image retrieval circuitry 118 utilizing searching history analysis 816 to refine the candidate result image set to generate a final result image set provided to the user, such as described in connection with elements 724 and 726 of FIG. 7. Operation 810 may comprise the user browsing identified result images and providing feedback. The image retrieval circuitry 118 may determine the provided feedback and update the maintained ROI-based searching history based on the provided feedback, at operation 818. Operation 818 may additionally or alternatively comprise the image retrieval circuitry 118 updating the maintained ROI-based searching history to include any patterns in the target ROI select and/or the relationship between the target ROIs and identified result images. The image retrieval process may conclude at operation 812.

Figure 9:
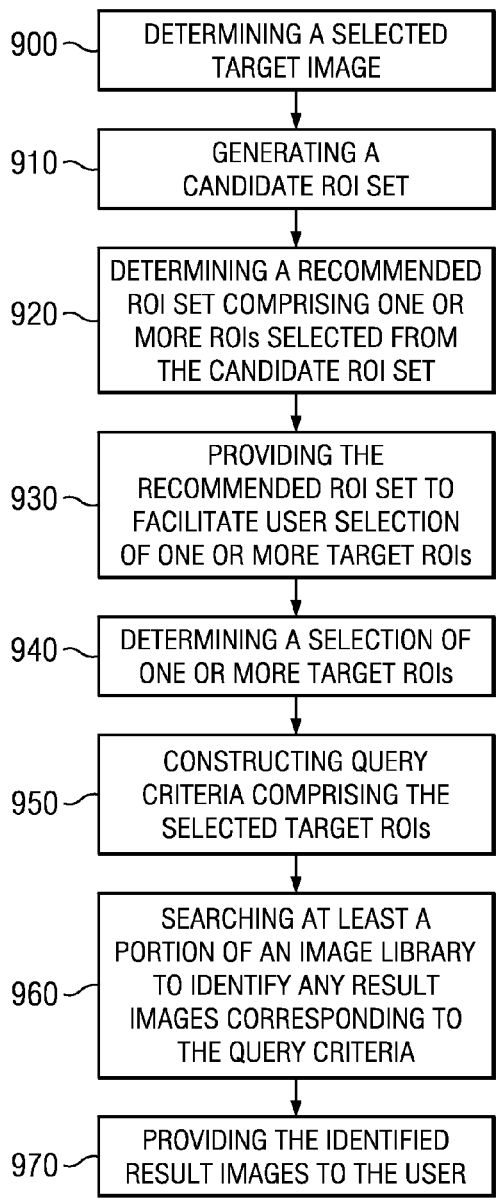
FIG. 9 illustrates a flowchart according to an example method for facilitating content-based image retrieval according to an example embodiment of the invention.

FIG. 9 illustrates a flowchart according to an example method for facilitating content-based image retrieval according to an example embodiment of the invention. The operations illustrated in and described with respect to FIG. 9 may, for example, be performed by and/or under the control of the image retrieval circuitry 118. Operation 900 may comprise determining a selected target image. Operation 910 may comprise generating a candidate ROI set comprising one or more ROIs within the target image. Operation 920 may comprise determining a recommended ROI set comprising one or more recommended ROIs selected from the candidate ROI set. The recommended ROIs may be determined based at least in part upon analysis of maintained ROI-based searching history. Operation 930 may comprise providing the recommended ROI set to facilitate user selection of one or more target ROIs as query criteria. Operation 940 may comprise determining a selection of one or more target ROIs. Operation 950 may comprise constructing query criteria comprising the selected target ROIs. Operation 960 may comprise searching at least a portion of an image library to identify any result images corresponding to the query criteria. Operation 970 may comprise providing the result images to the user for review. Although FIG. 9 is described with respect to selection of target ROIs within a single target image, as previously described, embodiments of the invention allow for selection of target ROIs from a plurality of target images in order to construct more comprehensive query criteria in instances when a target image does not include each of the ROIs that the user desires to be present in a result image.

Figure 10:
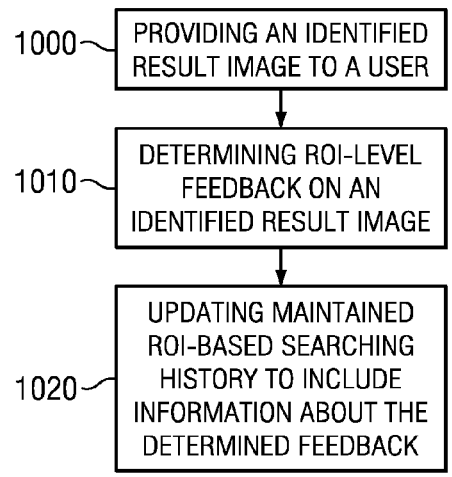
FIG. 10 illustrates a flowchart according to an example method for determining region of interest level feedback according to an example embodiment of the invention.

FIG. 10 illustrates a flowchart according to an example method for determining region of interest level feedback according to an example embodiment of the invention. The operations illustrated in and described with respect to FIG. 10 may, for example, be performed by and/or under the control of the image retrieval circuitry 118. Operation 1000 may comprise providing an identified result image to a user. Operation 1010 may comprise determining ROI-level feedback on the identified result image. Operation 1020 may comprise updating maintained ROI-based searching history to include information about the determined feedback.

FIGS. 4 and 8-10 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., an image retrieval apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and computing device users. Embodiments of the invention provide automatically generated recommended regions of interest (ROIs) within a selected target image. The recommended ROIs allow a user to more conveniently and quickly select one or more ROIs within a target image to specify as query criteria for retrieval of related images. Additionally, use of automatically recommended ROIs may improve searching speed and accuracy of search results. Some embodiments of the invention allow a user to select multiple ROIs across a plurality of different target images as query criteria for a single image retrieval search. Such embodiments of the invention allow a user to more fully construct query criteria and provide for generation of a more relevant set of search results in instances when none of the target images includes each of the ROI elements that the user wants retrieved images to include.

Some embodiments of the invention provide an ROI-based searching history analysis functionality configured to learn user input patterns and determine feedback on searching results to achieve customization and better searching results. The ROI-based searching history functionality is leveraged in such embodiments to improve ROI recommendations and/or search results. Some embodiments of the invention determine meaningful feedback beyond merely whether a result image is related to the query criteria that may improve the searching history analysis functionality. In this regard, some embodiments of the invention determine feedback on an ROI level such that feedback may be determined as to whether a result image is related to each individual target ROI selected as a component of the search criteria. This feedback may be used in subsequent searches to improve search results.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining a selected target image;
   generating a candidate region of interest set, the candidate region of interest set comprising one or more regions of interest within the target image;
   determining a recommended region of interest set, the recommended region of interest set comprising one or more recommended regions of interest selected from the candidate region of interest set based at least in part upon evaluation criteria, the evaluation criteria being determined based at least in part upon analysis of maintained region of interest-based searching history; and
   providing the recommended region of interest set for user selection of one or more target regions of interest from the recommended region of interest set as query criteria for searching an image library for one or more result images.

2. The method of claim 1, wherein determining the recommended region of interest set comprises:
   computing a recommendation score for each candidate region of interest in the candidate region of interest set using the evaluation criteria; and
   determining one or more recommended regions of interest from the candidate region of interest set based at least in part upon the computed recommendation scores.

3. The method of claim 1, wherein the maintained region of interest-based searching history comprises a history of one or more of:
   previously recommended regions of interest;
   regions of interest previously selected as target regions of interest;
   historical relationships between target regions of interest selected as query criteria and corresponding search result images; or
   feedback on previous search result images indicating correspondence between the search result images and corresponding query criteria used to identify the search result images.

4. The method of claim 1, further comprising:
   determining a selection of one or more target regions of interest within the selected target image as query criteria;
   searching at least a portion of the image library to identify a result image corresponding to the query criteria;
   providing the identified result image to the user;
   determining feedback on the identified result image, the feedback comprising an indication of whether the identified result image relates to a selected target region of interest; and
   updating the region of interest-based searching history to include information about the feedback.

5. The method of claim 4, further comprising updating the region of interest-based searching history to include one or more of:
   information about the identified result image and the selected one or more target regions of interest; or
   information about a relationship between the identified result image and the selected one or more target regions of interest.

6. The method of claim 4, wherein searching the at least a portion of the image library comprises searching at least a portion of the image library to identify a plurality of result images corresponding to the query criteria; and further comprising:
   filtering the plurality of result images based at least in part upon the maintained region of interest-based searching history by filtering out any result images known from the maintained region of interest-based searching history to not be related to a selected target region of interest.

7. The method of claim 4, wherein searching the at least a portion of the image library comprises:
   determining a region of interest class for a selected target region of interest;
   analyzing the maintained region of interest-based searching history to determine images within the image library known to comprise a region of interest having the determined region of interest class; and
   searching the determined images to identify a result image corresponding to the query criteria.

8. The method of claim 4, further comprising
   determining a second selected target image; and
   determining, prior to searching the at least a portion of the image library, a selection of one or more target regions of interest within the second selected target image, wherein the query criteria further comprises the one or more target regions of interest selected from the second selected target image.

9. An apparatus comprising at least one processor and at least one memory storing computer program code, wherein the at least one memory and stored computer program code are configured to, with the at least one processor, cause the apparatus to at least:
   determine a selected target image;
   generate a candidate region of interest set, the candidate region of interest set comprising one or more regions of interest within the target image;
   determine a recommended region of interest set, the recommended region of interest set comprising one or more recommended regions of interest selected from the candidate region of interest set based at least in part upon evaluation criteria, the evaluation criteria being determined based at least in part upon analysis of maintained region of interest-based searching history; and
   provide the recommended region of interest set for user selection of one or more target regions of interest from the recommended region of interest set as query criteria for searching an image library for one or more result images.

10. The apparatus of claim 9, wherein the at least one memory and stored computer program code are configured to, with the at least one processor, cause the apparatus to determine the recommended region of interest set at least in part by:
    computing a recommendation score for each candidate region of interest in the candidate region of interest set using the evaluation criteria; and
    determining one or more recommended regions of interest from the candidate region of interest set based at least in part upon the computed recommendation scores.

11. The apparatus of claim 9, wherein the maintained region of interest-based searching history comprises a history of one or more of:
    previously recommended regions of interest;
    regions of interest previously selected as target regions of interest;
    historical relationships between target regions of interest selected as query criteria and corresponding search result images; or feedback on previous search result images indicating correspondence between the search result images and corresponding query criteria used to identify the search result images.

12. The apparatus of claim 9, wherein the at least one memory and stored computer program code are configured to, with the at least one processor, further cause the apparatus to:
   determine a selection of one or more target regions of interest within the selected target image as query criteria;
   search at least a portion of the image library to identify a result image corresponding to the query criteria;
   provide the identified result image to the user;
   determine feedback on the identified result image, the feedback comprising an indication of whether the identified result image relates to a selected target region of interest; and
   update the region of interest-based searching history to include information about the feedback.

13. The apparatus of claim 12, wherein the at least one memory and stored computer program code are configured to, with the at least one processor, further cause the apparatus to update the region of interest-based searching history to include one or more of:
   information about the identified result image and the selected one or more target regions of interest; or
   information about a relationship between the identified result image and the selected one or more target regions of interest.

14. The apparatus of claim 12, wherein the at least one memory and stored computer program code are configured to, with the at least one processor, cause the apparatus to search the at least a portion of the image library by searching at least a portion of the image library to identify a plurality of result images corresponding to the query criteria; and wherein the at least one memory and stored computer program code are configured to, with the at least one processor, further cause the apparatus to:
   filter the plurality of result images based at least in part upon the maintained region of interest-based searching history by filtering out any result images known from the maintained region of interest-based searching history to not be related to a selected target region of interest.

15. The apparatus of claim 12, wherein the at least one memory and stored computer program code are configured to, with the at least one processor, cause the apparatus to search the at least a portion of the image library at least in part by:
   determining a region of interest class for a selected target region of interest;
   analyzing the maintained region of interest-based searching history to determine images within the image library known to comprise a region of interest having the determined region of interest class;
   and searching the determined images to identify a result image corresponding to the query criteria.

16. The apparatus of claim 12, wherein the at least one memory and stored computer program code are configured to, with the at least one processor, further cause the apparatus to:
   determine a second selected target image; and
   determine, prior to searching the at least a portion of the image library, a selection of one or more target regions of interest within the second selected target image, wherein the query criteria further comprises the one or more target regions of interest selected from the second selected target image.

17. The apparatus of claim 9, wherein the apparatus comprises or is embodied on a mobile phone, the mobile phone comprising user interface circuitry and user interface software stored on one or more of the at least one memory; wherein the user interface circuitry and user interface software are configured to:
   facilitate user control of at least some functions of the mobile phone through use of a display; and
   cause at least a portion of a user interface of the mobile phone to be displayed on the display to facilitate user control of at least some functions of the mobile phone.

18. A computer program product comprising at least one non-transitory computer-readable storage medium having computer-readable program instructions stored therein, the computer-readable program instructions comprising:
   program instructions configured to determine a selected target image;
   program instructions configured to generate a candidate region of interest set, the candidate region of interest set comprising one or more regions of interest within the target image;
   program instructions configured to determine a recommended region of interest set, the recommended region of interest set comprising one or more recommended regions of interest selected from the candidate region of interest set based at least in part upon evaluation criteria, the evaluation criteria being determined based at least in part upon analysis of maintained region of interest-based searching history; and
   program instructions configured to provide the recommended region of interest set for user selection of one or more target regions of interest from the recommended region of interest set as query criteria for searching an image library for one or more result images.

19. The computer program product of claim 18, wherein the program instructions configured to determine the recommended region of interest set comprise:
   program instructions configured to compute a recommendation score for each candidate region of interest in the candidate region of interest set using the evaluation criteria; and
   program instructions configured to determine one or more recommended regions of interest from the candidate region of interest set based at least in part upon the computed recommendation scores.

20. The computer program product of claim 18, wherein the maintained region of interest-based searching history comprises a history of one or more of:
   previously recommended regions of interest;
   regions of interest previously selected as target regions of interest;
   historical relationships between target regions of interest selected as query criteria and corresponding search result images; or feedback on previous search result images indicating correspondence between the search result images and corresponding query criteria used to identify the search result images.

* * * * *